United States Patent
Chen et al.

(10) Patent No.: US 10,251,074 B2
(45) Date of Patent: Apr. 2, 2019

(54) DYNAMIC ACCESS POINT GROUPING METHOD AND DEVICE

(71) Applicant: CHINA ACADEMY OF TELECOMMUNICATIONS TECHNOLOGY, Beijing (CN)

(72) Inventors: Shanzhi Chen, Beijing (CN); Bo Hu, Beijing (CN); Fei Qin, Beijing (CN); Jiamin Liu, Beijing (CN); Na Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/756,539

(22) PCT Filed: Aug. 22, 2016

(86) PCT No.: PCT/CN2016/096248
§ 371 (c)(1),
(2) Date: Feb. 28, 2018

(87) PCT Pub. No.: WO2017/036320
PCT Pub. Date: Mar. 9, 2017

(65) Prior Publication Data
US 2018/0270673 A1    Sep. 20, 2018

(30) Foreign Application Priority Data

Sep. 1, 2015   (CN) .......................... 2015 1 0552870

(51) Int. Cl.
*H04W 24/02*   (2009.01)
*H04W 8/00*    (2009.01)
(Continued)

(52) U.S. Cl.
CPC ........... *H04W 24/02* (2013.01); *H04W 8/005* (2013.01); *H04W 8/08* (2013.01);
(Continued)

(58) Field of Classification Search
CPC ....... H04W 24/02; H04W 8/005; H04W 8/08; H04W 72/0433; H04W 92/12; H04W 92/14
(Continued)

(56) References Cited

U.S. PATENT DOCUMENTS

2009/0290518 A1* 11/2009 Gossain ................ H04L 1/0026
                                                     370/310
2010/0093355 A1   4/2010 Voyer et al.
(Continued)

FOREIGN PATENT DOCUMENTS

CN         1933670 A  *  3/2007
CN        101779491 A     7/2010
(Continued)

OTHER PUBLICATIONS

International Search Report for PCT/CN2016/096248 dated Nov. 22, 2016 and its English translation provided by WIPO.
(Continued)

*Primary Examiner* — Kamran Afshar
*Assistant Examiner* — Farid Seyedvosoghi
(74) *Attorney, Agent, or Firm* — Ladas & Parry, LLP

(57) ABSTRACT

A dynamic AP grouping method and a dynamic AP grouping device are provided. It is able to provide services to UE in a UE-centered manner as compared with a traditional mode where the services are provided to the UE in a network-centered manner, thereby to prevent the UE from frequently acquiring a network environment, and provide the data transmission service to the UE at a low speed or in a stationary state through APGs. In addition, during the move-
(Continued)

ment of the UE, it is able to transmit the services to the UE through dynamic refresh of APs in the APGs and coordination of the APs in the APG. It is able to reduce the number of handover operations made by the UE, and perform the handover operation in the APG not through a core network, thereby to reduce signaling load of a core network.

16 Claims, 15 Drawing Sheets

(51) Int. Cl.
  *H04W 8/08* (2009.01)
  *H04W 72/04* (2009.01)
  *H04W 92/12* (2009.01)
  *H04W 92/14* (2009.01)
(52) U.S. Cl.
  CPC ........ *H04W 72/0433* (2013.01); *H04W 92/12* (2013.01); *H04W 92/14* (2013.01)
(58) Field of Classification Search
  USPC ............. 455/426.12, 426.2, 432.1, 436, 446; 370/338, 331
  See application file for complete search history.

(56) References Cited

U.S. PATENT DOCUMENTS

| | | | | |
|---|---|---|---|---|
| 2010/0184432 | A1* | 7/2010 | Yano | H04W 36/12 455/435.1 |
| 2012/0115515 | A1* | 5/2012 | Lopez | H04W 68/04 455/458 |
| 2014/0179325 | A1 | 6/2014 | Xu et al. | |
| 2015/0189631 | A1* | 7/2015 | He | H04W 72/042 455/418 |
| 2016/0119347 | A1 | 4/2016 | Liu et al. | |
| 2016/0205598 | A1 | 7/2016 | Tian | |

FOREIGN PATENT DOCUMENTS

| | | | |
|---|---|---|---|
| CN | 101795465 | A | 8/2010 |
| CN | 102300287 | A | 12/2011 |
| CN | 102685715 | A | 9/2012 |
| CN | 103517252 | A | 1/2014 |
| CN | 103634848 | A | 3/2014 |
| CN | 103906152 | A | 7/2014 |
| CN | 104125662 | A | 10/2014 |
| CN | 104703165 | A | 6/2015 |
| CN | 105451250 | A | 3/2016 |

OTHER PUBLICATIONS

Written Opinion of the International Search Authority PCT/CN2016/096248 dated Nov. 22, 2016 and its English translation provided by Google Translate.
First Office Action for Chinese Application No. 201510552870.4 dated Jul. 5, 2016, with machine translation provided by Espacenet.
Second Office Action for Chinese Application No. 201510552870.4 dated Dec. 12, 2016, with machine translation provided by Espacenet.
First Search for Chinese Application No. 201510552870.4 dated Jun. 7, 2016, with machine translation provided by Espacenet.
Supplemental Search for Chinese Application No. 201510552870.4 dated May 17, 2017, with machine translation provided by Espacenet.
Written Opinion of the International Search Authority PCT/CN2016/096248 dated Nov. 22, 2016 and its English translation provided by Patentscope.

* cited by examiner

DYNAMIC ACCESS POINT GROUPING METHOD AND DEVICE

CROSS-REFERENCE TO RELATED APPLICATIONS

The present application is the U.S. national phase of PCT Application PCT/CN2016/096248 filed on Aug. 22, 2016 which claims the priority to Chinese patent application No. 201520552870.4 filed on Sep. 1, 2015, the disclosures of which are incorporated herein by reference in their entireties.

TECHNICAL FIELD

The present disclosure relates to the field of wireless communication technology, in particular to a dynamic access point (AP) grouping method and a dynamic AP grouping device.

BACKGROUND

With the advent of Heterogeneous Network (HetNet), Ultra Dense Network (UDN) and a Device-to-Device Communication (D2D) communication mode, network architecture is capable of providing a multi-layer coverage mode as compared with a traditional cellular network where a single-layer coverage mode is provided. A radius of a cell coverage becomes smaller and smaller, so there is a large challenge in inter-cell interference and mobility. Ring & Young initially raised the concept of cellular network. In a traditional cellular system, each base station merely covers a limited region, i.e., a cell, due to the limitation of transmission power. The base station is just a control and data center for the cell, and it takes charge of radio resource management, signal processing and mobility management within the coverage thereof. Due to the existence of inter-cell interference and coverage black hole, it is impossible for this network deployment mode to provide excellent system performance. Through a centralized or coordinated processing mode among a plurality of base stations, such techniques as Distributed Antenna System (DAS) and Coordinated Multiple Point (CoMP) have started to change the concept of "cellular" with a single base station as a management center. For hyper cellular architecture (Business Communication Group (BCG)) defined by Greentouch and dual-connection defined by the $3^{rd}$ Generation Partnership Project (3GPP), signaling and data for each base station are separated from each other. In order to achieve uplink/downlink decoupling of traffic offload in the HetNet in a better manner, the traditional concept of "cellular" has been further broken through.

Due to the emergence of a mobile network, such businesses as on-line video streams, video conferences and interactive games have been deployed on a large scale, resulting in a huge number of network traffic. Especially at a densely urbanized region or a hotspot region, the mobile communication network has confronted with an explosion of the data traffic. Currently, one feasible scheme for solving the problem in the explosion of the data traffic is to reduce a coverage area of the cell and increase the number of the deployed cells, so as to increase the frequency multiplexing as well as the capacity. The 3GPP has proposed a scheme for increasing the network capacity through the deployment of Femtocell, Picocell and Microcell, so as to achieve the traffic offload. Small cell enhancement technique is a feature of the 3GPP. Mobile and wireless communications Enablers for the Twenty-twenty Information Society (METIS) has proposed the concept of "UDN", studied the use of context information to optimize the selection of access points by a User Equipment (UE), and analyzed the provision of the services for the UE through a cell cluster, so as to improve the mobility by reducing unnecessary handover operations and reducing handover operations within a small region.

Currently, the UE is provided with the data services mainly in a network-centered manner, and the UE needs to acquire a network environment and trigger the handover operation through detecting a signal. In the case of network-intensive deployment, there are various APs for a Multi Radio Access Technology (Multi-RAT), and the coverage area is reduced. Due to the dynamic change of the APs, the UE needs to perform the handover operation frequently even when the UE moves at a low speed or even in a stationary state. At this time, the UE needs to acquire the network environment at any time so as to perform the handover operation, thereby the user experience may be seriously adversely affected. In addition, the frequent handover operation may result in the signaling load for a core network.

A current cell cluster mechanism is mainly used for resource scheduling and allocation. Most of the cell clusters are predefined. Through providing the services to the UE using the cell clusters, it is able to reduce the number of the handover operations made by the UE. In the UDN, each AP may be accessed dynamically in accordance with the load of the network and the energy-saving requirement. The UE may serve as an AP for providing the services to the other UEs. The diversity of the user requirements results in different bandwidths for the UEs, so it is necessary to perform coordination between multiple layers of the network, so as to provide the services to the UE. In this regard, through the cell clusters in a stationary state, it is impossible to dynamically add the new APs into a service list, thereby it is adverse to the provision of continuous services to the UE. In addition, it is also adverse to the coordination among different RATs through the cell cluster mechanism in the traditional network, so it is impossible for a future network system to provide optimum services to the UE.

SUMMARY

An object of the present disclosure is to provide a dynamic AP grouping method and a dynamic AP grouping device, so as to dynamically refreshing access point groups (APGs) for the UEs in a UE-centered manner, thereby to prevent the UE from frequently acquiring the network environment and reduce the signaling load for the core network.

In one aspect, the present disclosure provides in some embodiments a dynamic AP grouping method, including steps of: receiving, by a first Local Service Center (LSC) at an access network side, a first notification message transmitted from a first AP after the first AP has found a first UE which the first AP is capable of serving, the first AP being an AP belonging to the first LSC; when information about a serving LSC of the first UE is recorded by the first LSC, determining whether or not the first LSC is the serving LSC of the first UE in accordance with the information, information about a first APG corresponding to the first UE and LSCs corresponding to the first UE being maintained on the serving LSC of the first UE, the first APG including member APs which are currently capable of serving the first UE, the LSCs corresponding to the first UE including LSCs to which respective member APs belong; and when the first LSC has determined that it is, the serving LSC of the first UE, adding the first AP to the first APG corresponding to the first UE, and transmitting a refresh message of the first APG to each member AP in the first APG, the refresh message carrying information about the member APs in the first APG.

In another aspect, the present disclosure provides in some embodiments a dynamic AP grouping method, including steps of: receiving, by a Network Service Center (NSC) at a core network side, an inquiry message for inquiring a serving LSC of a first UE from a first LSC at an access network side, the first LSC belonging to the NSC; determining, by the NSC, whether or not information about the serving LSC corresponding to the first UE is maintained locally in accordance with the inquiry message; when the information about the serving LSC corresponding to the first UE is not maintained locally, allocating a first APG for the first UE, configuring the first LSC as the serving LSC of the first UE, transmitting a first configuration message to the first LSC so as to indicate that the first LSC is configured as the serving LSC of the first UE, and establishing a correspondence among the first UE, the first APG and the serving LSC, the first configuration message carrying information about the first APG; and when the information about the serving LSC corresponding to the first UE is maintained locally, returning the information about the serving LSC corresponding to the first UE to the first LSC.

In yet another aspect, the present disclosure provides in a dynamic AP grouping method, including steps of: after a first AP has found a first UE capable of being served by the first AP, transmitting, by the first AP, a first notification message to a first LSC to which the first AP belongs; receiving, by the first AP, a first refresh message of a first APG from the first LSC, the first refresh message carrying information about member APs in the first APG corresponding to the first UE, the first APG including the member APs which are currently capable of serving the first UE; and maintaining, by the first AP, the first APG corresponding to the first UE locally in accordance with the first refresh message, and providing a data transmission service to the first UE in a Coordinated Multiple Point (CoMP) transmission manner with the member APs in the first APG.

In still yet another aspect, the present disclosure provides in some embodiments a first LSC at an access network side, including: a first reception unit configured to receive a first notification message transmitted from a first AP after the first AP has found a first UE which the first AP is capable of serving, the first AP being an AP belonging to the first LSC; a first determination unit configured to, when information about a serving LSC of the first UE is recorded by the first LSC, determine whether or not the first LSC is the serving LSC of the first UE in accordance with the information, information about a first APG corresponding to the first UE and LSCs corresponding to the first UE being maintained on the serving LSC of the first UE, the first APG including member APs which are currently capable of serving the first UE, the LSCs corresponding to the first UE including LSCs to which respective member APs belong; and a first processing unit configured to, when the first LSC has determined that it is the serving LSC of the first UE, add the first AP to the first APG corresponding to the first UE, and transmit a refresh message of the first APG to each member AP in the first APG, the refresh message carrying information about the member APs in the first APG.

In still yet another aspect, the present disclosure provides in some embodiments an NSC at a core network side, including: a first reception unit configured to receive an inquiry message for inquiring a serving LSC of a first UE from a first LSC at an access network side, the first LSC belonging to the NSC; a first determination unit configured to determine whether or not information about the serving LSC corresponding to the first UE is maintained locally in accordance with the inquiry message; a first processing unit configured to, when the information about the serving LSC corresponding to the first UE is not maintained locally, allocate a first APG for the first UE, configure the first LSC as the serving LSC of the first UE, transmit a first configuration message to the first LSC so as to indicate that the first LSC is configured as the serving LSC of the first UE, and establish a correspondence among the first UE, the first APG and the serving LSC, the first configuration message carrying information about the first APG; and a second processing unit configured to, when the information about the serving LSC corresponding to the first UE is maintained locally, return the information about the serving LSC corresponding to the first UE to the first LSC.

In still yet another aspect, the present disclosure provides in some embodiments a first AP, including: a finding unit configured to find a first UE capable of being served by the first AP and transmit a first notification message to a first LSC to which the first AP belongs; a first reception unit configured to receive a first refresh message of a first APG from the first LSC, the first refresh message carrying information about member APs in the first APG corresponding to the first UE, the first APG including the member APs which are currently capable of serving the first UE; and a refresh unit configured to maintain the first APG corresponding to the first UE locally in accordance with the first refresh message, and provide a data transmission service to the first UE in a CoMP transmission manner with the member APs in the first APG.

In still yet another aspect, the present disclosure provides in some embodiments a dynamic AP grouping method, including steps of: receiving, by a LSC at an access network side, a first notification message transmitted from a first AP after the first AP has found a first UE which the first AP is capable of serving, the first AP being an AP belonging to the first LSC; determining, by the LSC, whether or not information about a first APG corresponding to the first UE is maintained locally, the first APG including member APs belonging to the LSC and currently capable of serving the first UE; and when the information about the first APG is maintained locally, adding, by the LSC, the first AP to the first APG in accordance with the first AP, and transmitting a refresh message of the first APG to each member AP in the first APG, the refresh message carrying information about the member APs in the first APG.

In a possible embodiment of the present disclosure, when the information about the first APG is not maintained locally, the dynamic AP grouping method further includes: transmitting, by the LSC, a first request message for requesting an NSC at a core network side to allocate APGs for the first UE to the NSC, and receiving a first configuration message from the NSC with respect to the first request message, the first configuration message carrying the first APG re-allocated by the NSC and uniquely corresponding to the first UE; and recording and maintaining the information about the first APG in accordance with the first configuration message, and transmitting the refresh message of the first APG to each member AP in the first APG, the first APG including the first AP.

In a possible embodiment of the present disclosure, when the first AP is incapable of serving the first UE, the dynamic AP grouping method further includes deleting, by the LSC, the first AP from the first APG, and transmitting the refresh message of the first APG to each member AP in the first APG. The step of determining that the first AP is incapable of serving the first UE includes receiving, by the LSC, from the first AP a second request message which is transmitted when the first AP is to stop serving the first UE and which is used to request the deletion of the first AP from the first APG, or detecting, by the LSC, that the first AP is in a predetermined abnormal state.

In a possible embodiment of the present disclosure, after the first AP has been deleted from the first APG, the dynamic AP grouping method further includes: determining, by the LSC, whether or not the number of the member APs in the first APG is 0; and when the number of the member APs in the first APG is 0, deleting the information about the first APG maintained locally, and transmitting to the NSC a cancellation message for cancelling the first APG.

In still yet another aspect, the present disclosure provides in some embodiments a dynamic AP grouping method, including steps of: receiving, by an NSC at a core network side, a first request message for requesting the NSC to allocate APGs for a first UE from an LSC at an access network side, the first request message being transmitted from the LSC when the LSC has received a first notification message from a first AP after the LSC has found that the first AP is capable of serving the first UE and when information about a first APG corresponding to the first UE is not maintained by the LSC locally; and allocating, by the NSC, the first APG for the first UE in accordance with the first request message, recording a correspondence among the first UE, the first APG and the LSC, and transmitting a first configuration message carrying the information about the first APG to the LSC.

In a possible embodiment of the present disclosure, the dynamic AP grouping method further includes: receiving, by the NSC, a cancellation message for cancelling the first APG from the LSC when the number of member APs in the first APG is 0; and cancelling, by the NSC, the first APG allocated for the first UE in accordance with the cancellation message, and deleting the correspondence among the first UE, the first APG and the LSC recorded locally.

In still yet another aspect, the present disclosure provides in some embodiments an LSC at an access network side, including: a reception unit configured to receive a first notification message transmitted from a first AP after the first AP has found a first UE which the first AP is capable of serving, the first AP being an AP belonging to the first LSC; a determination unit configured to determine whether or not information about a first APG corresponding to the first UE is maintained locally, the first APG including member APs belonging to the LSC and currently capable of serving the first UE; and a first refresh unit configured to, when the information about the first APG is maintained locally, add the first AP to the first APG in accordance with the first AP, and transmit a refresh message of the first APG to each member AP in the first APG, the refresh message carrying information about the member APs in the first APG.

In a possible embodiment of the present disclosure, the LSC further includes: a request unit configured to, when the information about the first APG is not maintained locally, transmit a first request message for requesting an NSC at a core network side to allocate APGs for the first UE to the NSC, and receive a first configuration message from the NSC with respect to the first request message, the first configuration message carrying the first APG re-allocated by the NSC and uniquely corresponding to the first UE; and a second refresh unit configured to record and maintain the information about the first APG in accordance with the first configuration message, and transmit the refresh message of the first APG to each member AP in the first APG, the first APG including the first AP.

In a possible embodiment of the present disclosure, the LSC further includes a third refresh unit configured to, when the first AP is incapable of serving the first UE, delete the first AP from the first APG, and transmit the refresh message of the first APG to each member AP in the first APG. The first AP is determined to be incapable of serving the first UE includes that the LSC has received from the first AP a second request message which is transmitted when the first AP is to stop serving the first UE and which is used to request the deletion of the first AP from the first APG, or the LSC has detected that the first AP is in a predetermined abnormal state.

In a possible embodiment of the present disclosure, the LSC further includes a cancellation request unit configured to, after the first AP has been deleted from the first APG, determine whether or not the number of the member APs in the first APG is 0, and when the number of the member APs in the first APG is 0, delete the information about the first APG maintained locally and transmit to the NSC a cancellation message for cancelling the first APG.

In still yet another aspect, the present disclosure provides in some embodiments an NSC at a core network side, including: a first reception unit configured to receive a first request message for requesting the NSC to allocate APGs for a first UE from an LSC at an access network side, the first request message being transmitted from the LSC when the LSC has received a first notification message from a first AP after the LSC has found that the first AP is capable of serving the first UE and when information about a first APG corresponding to the first UE is not maintained by the LSC locally; and an allocation unit configured to allocate the first APG for the first UE in accordance with the first request message, record a correspondence among the first UE, the first APG and the LSC, and transmit a first configuration message carrying the information about the first APG to the LSC.

In a possible embodiment of the present disclosure, the NSC further includes: a second reception unit configured to receive a cancellation message for cancelling the first APG from the LSC when the number of member APs in the first APG is 0; and a cancellation processing unit configured to cancel the first APG allocated for the first UE in accordance with the cancellation message, and delete the correspondence among the first UE, the first APG and the LSC recorded locally.

According to the dynamic AP grouping method and device in the embodiments of the present disclosure, it is able to provide services to the UE in a UE-centered manner as compared with the traditional mode where the services are provided to the UE in a network-centered manner, thereby to prevent the UE from frequently acquiring the network environment, and provide the data transmission service to the UE at a low speed or in a stationary state through the APGs. In addition, during the movement of the UE, it is able to transmit the services to the UE through dynamic refresh of the APGs and coordination of the APs in the APG. In a word, in the embodiments of the present disclosure, it is able to reduce the number of handover operations made by the UE, and perform the handover operation in the APG not through a core network, thereby to reduce the signaling load of the core network. In addition, in the embodiments of the present disclosure, it is also able to dynamically acquire the network environment, thereby to adjust in real time the AP by which the UE is served.

DETAILED DESCRIPTION OF THE EMBODIMENTS

Figure 1:
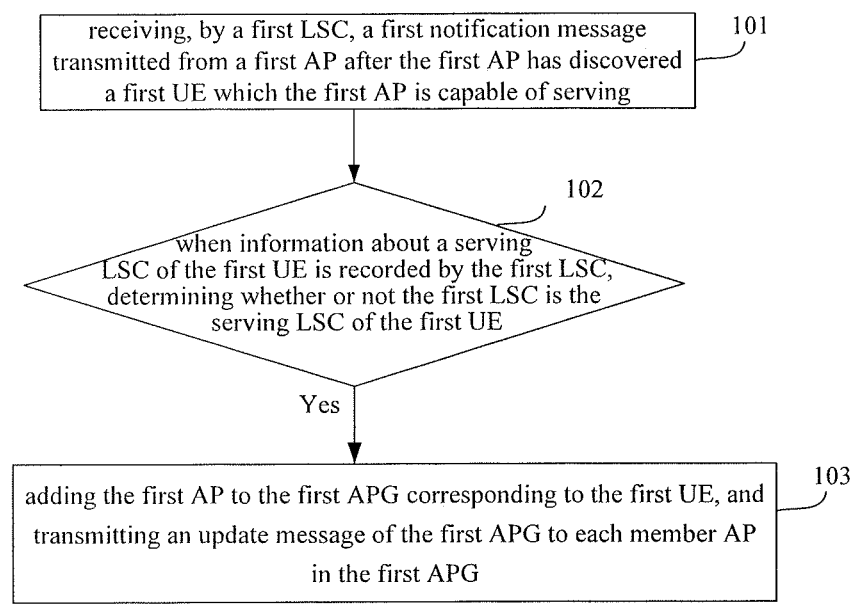
FIGS. 1-6 are flow charts of a dynamic AP grouping method at an LSC side according to one embodiment of the present disclosure.

In order to make the technical solutions and the objects of the present disclosure more apparent, the present disclosure will be described hereinafter in conjunction with the drawings and embodiments.

Mobile communication has already changed our lives in a profound way. In a mobile communication network, a mobile data traffic volume shoots up, and various new services and new application scenarios continue to appear. A large number of unpredictable UEs access to a network at the same time and thereby are aggregated at a region with a limited coverage area. Along with the development of $5^{th}$-Generation (5G) technology, a UDN is used to increase a deployment density of low-power base station at a hotspot region of a cellular network, so as to improve the system capacity and network coverage, and reduce the time delay and the power consumption.

For a traditional network arranged in a network-centered manner, various functions, e.g., service control and mobility control, are achieved at a high-layer. The network includes a Mobility Management Entity (MME), a Packet Data Network Gateway/Serving Gateway (P-GW/S-GW). Functional modules in a core network, such as the MME, need to be accessed, so as to provide such services as a handover operation made by the UE and position management, resulting in heavy network signaling load and data redundancy transmission. In a UDN scenario where a Multi-RAT technology is used and a plurality of AP exists, a user interface and a control interface are closely coupled to each other, so the UE needs to perform the handover operation frequently, and thereby the mobility management, network resource management and interference management become more complex.

In the conventional UDN, the UE needs to frequently acquire an access environment and frequently perform the handover operation, so the user experience may be adversely affected, and network load is not balanced. In addition, it is impossible for a statically-programmed cell cluster to meet the requirement of dynamic change of network APs. The present disclosure provides a UE-centered dynamic AP grouping method by introducing a UE-centered concept into a mobile network, so as to select an appropriate APG for providing the services to the UE in accordance with the requirements of the UE and a network state, thereby to prevent the UE from frequently acquiring a network environment, and ensure the continuous service transmission through dynamic organization and coordination of the APGs during the movement of the UE.

The present disclosure provides in some embodiments a UE-centered dynamic AP grouping (DAPGing) method for a UDN, so as to achieve the AP grouping operation in a UE-centered manner. The UDN includes a plurality of APs based on different RATs, and the UE may access to a corresponding AP in accordance with its own access ability, so as to acquire the data transmission services.

In the embodiments of the present disclosure, a user interface is isolated from a control interface. The APs in the APG are refresh at the control interface, and the corresponding network access and communication ability is provided in accordance with the requirements of the UE. The services are provided by the APG to the UE via a virtual link, i.e., the data transmission services are provided by one or more APs in the APG to the UE in a CoMP manner. Some terms involved in the embodiments of the present disclosure will be described hereinafter.

APG: a set of wireless APs surrounding the EU are dynamically acquired by the network. The APG is a logic structure of the wireless APs at a management region of the UDN and capable of providing the services to the UE. One group of APs may be used to provide the services to the UE. In order to provide the services in a UE-centered manner, in the DAPGing method, the network access service may be provided by the APG by following the UE. During the movement of the UE, a controller at a receiving end may dynamically refresh an AP list in accordance with a condition of the network APs.

NSC: a control device at an edge of the core network. The NSC is used to achieve a control function and a transmission function at a network side. The NSC may be a physical entity, or a logic device, e.g., a logic module arranged in the other physical entity.

One or more NSCs may be arranged at the core network side, and each NSC may be used to manage LSCs in its management range. In the embodiments of the present disclosure, the LSCs in the management range of each NSCN may be preconfigured, and a communication link may be established between each LSC and the NSC to which the LSC belongs.

In some embodiments of the present disclosure, the APG is allocated by the NSC for each UE and corresponds to the UE within the management range of the NSC, respectively. Hence, each APG may be indicated by an APG Identity (ID), and the APGs belonging to a same NSC may have different IDs. A correspondence between the APG allocated by the NSC and the UE may be maintained by the NSC.

LSC: a control device at an access network side. The LSC is configured to separate the control interface from the user interface at a wireless receiving end, and all types of APs need to be backhauled to the LSC. The LSC may be a physical entity, or a logic device, e.g., a logic module arranged in the other physical entity.

For the UE, the LSCs may include serving LSCs and non-serving LSCs. Usually, each UE merely includes one serving LSC and one or more non-serving LSCs. Relevant information about the APGs corresponding to the UE, e.g., the APG IDs and member APs in the APG, is maintained on the serving LSC. In addition, relevant information about the LSCs corresponding to the UE, e.g., the serving LSC and the non-serving LSCs, and information about the member APs corresponding to the UE and belonging to each LSC, may also be maintained on the serving LSC. A plurality of LSCs may be arranged at the access network side, and each LSC is configured to manage the APs within its management range. Each AP is in communication with the LSC to which the AP belongs. In the embodiments of the present disclosure, the APs within the management range of each LSC may be preconfigured on the LSC. In addition, after being enabled, the AP may find out an appropriate LSC (e.g., with a minimum time delay and a maximum bandwidth) through an automatic finding procedure, and then registered in the LSC, so as to become one member of the APs within the management range of the LSC.

In addition, a communication link may be established between any two LSCs at the access network side, so as to transmit and synchronize the relevant information. Considering the cost caused by the links, when there are a relatively small amount of LSCs, any two LSCs may be directly connected to each other, so as to form a star-topology structure among the LSCs. When there are a relatively large amount of LSCs, a connection may be merely established between each LSC and the NSC to which the LSC belongs, and for the respective LSCs managed by a same NSC, the information may be forwarded and synchronized via the NSC. Of course, both the direct connection between any two LSCs belonging to a same NSC and the communication connection between each LSC and the NSC to which the LSC belongs may be established simultaneously.

DAPGing: a mechanism where the network dynamically acquires a wireless environment surrounding the UE, so as to form the APG corresponding to the UE, thereby to provide the network transmission services in a UE-centered manner. The DAPGing implemented via architecture where the user interface is separated from the control interface is managed by the NSC at the network side and managed by the LSC at the access network side. Through the distributed management mode at the network side and a UE side, it is able to optimize the performance of transmitting services to UEs. At the access network side, the network may acquire the wireless environment surrounding the UE, manage the APGs, and configure information for the corresponding AR At the network side, it is necessary to ensure the uniqueness of the APG corresponding to the UE. A device at the access network side is managed and coordinated by a device at the network side. Through the management at the network side, it is able to achieve the relevant function such as initializing the APGs, refresh the member APs in each APG, performing the handover operation between the APGs, and cancelling the APG.

UE: a device at a user side, e.g., a device provided with a screen (or a display unit). To be specific, the UE may be a mobile phone, a flat-panel computer, a computing device with a display unit, an information display device, an image acquisition device or a communication device. Taking the mobile phone as an example, it may include a Radio Frequency (RF) circuit, a memory, an input unit, a Wireless Fidelity (WiFi) module, a display unit, a sensor, an audio circuit, a processor and a power source. It should be appreciated that, the above-mentioned members are for illustrative purposes only, and the mobile phone may include more or less members, or some of the members may be integrated, or the members may be arranged in a different way. In addition, depending on the standards/attributes of the access network, the UE may be provided with one or more access units, so as to find and access to the access network. For example, the mobile phone may be provided with a function of accessing to a WiFi network, a function of accessing to a $3^{rd}$-Generation (3G), $4^{th}$-Generation (4G) or Long Term Evolution (LTE) network, or a function of accessing to a cellular network.

The dynamic AP grouping method at an LSC side will be described hereinafter in conjunction with the embodiments.

As shown in FIG. 1, the present disclosure provides in some embodiments a dynamic AP grouping method for a UDN, which includes the following steps.

Step 101: receiving, by a first LSC at an access network side, a first notification message transmitted from a first AP after the first AP has found a first UE which the first AP is capable of serving, the first AP being an AP belonging to the first LSC.

Here, after discovering the first UE within its coverage, the first AP may determine that it may serve the first UE in accordance with its service capability (e.g., network access capability or its own load state) and a capability of the first UE (e.g., a network access capability of the first UE), and then transmit the first notification message to the first LSC to which the first AP belongs. The first notification message may carry information about the first AP and the first UE, e.g., IDs of the first AP and the first UE.

Step 102: when information about a serving LSC of the first UE is recorded by the first LSC, determining whether or not the first LSC is the serving LSC of the first UE in accordance with the information, information about a first APG corresponding to the first UE and LSCs corresponding to the first UE being maintained on the serving LSC of the first UE, the first APG including member APs which are currently capable of serving the first UE, the LSCs corresponding to the first UE including LSCs to which each member AP belongs.

Here, upon the receipt of the first notification message, the first LSC may determine whether or not the information about the serving LSC of the first UE is maintained on the first LSC, and if the information is maintained, determine whether or not the first LSC is the serving LSC of the first UE in accordance with the information.

Step 103: when the first LSC is the serving LSC of the first UE, adding the first AP to the first APG corresponding to the first UE, and transmitting a refresh message of the first APG to each member AP in the first APG so as to refresh the member APs in the first APG in accordance with the refresh message, the refresh message carrying information about the member APs in the first APG.

According to the dynamic AP grouping method in the embodiments of the present disclosure, when the first AP has newly found the first UE and the first AP is capable of serving the first UE, the first AP may transmit the first notification message carrying the information about the first UE and the first AP to the first LSC. In this way, when the first LSC is the serving LSC of the first UE and the APG (i.e., the first APG) has been allocated for the first UE, the first LSC may refresh the member APs in the first PAG, and transmit the refresh message of the first APG to each member AP in the first APGs, so as to refresh the member APs in the first APG. Then, the data transmission services may be provided to the first UE through one or more refresh member APs in the first APG in a CoMP mode. Through the above-mentioned steps, it is able to dynamically refresh the APG for providing the services to the UE in a UE-centered manner, thereby to prevent the UE from frequently acquiring a network environment and reduce the signaling load of a core network.

In Step 103, the first LSC needs to transmit the refresh message of the first APG to each member AP in the first APG. The member APs may belong to different LSCs, so the step of transmitting the refresh message of the first APG may include: determining non-serving LSCs of the LSCs corresponding to the first UE, and forwarding the refresh message from each non-serving LSC to each member AP in the first APG belonging to the non-serving LSC; and directly transmitting the refresh message to each member AP in the first APG belonging to the serving LSC. In other words, for each member AP belonging to the serving LSC, the serving LSC may directly transmit the refresh message of the first APG to the member AP. For each member AP belonging to the non-serving LSC, the serving LSC may transmit the refresh message to the non-serving LSC, and then the non-serving LSC may forward the refresh message to its member AP.

Figure 2:
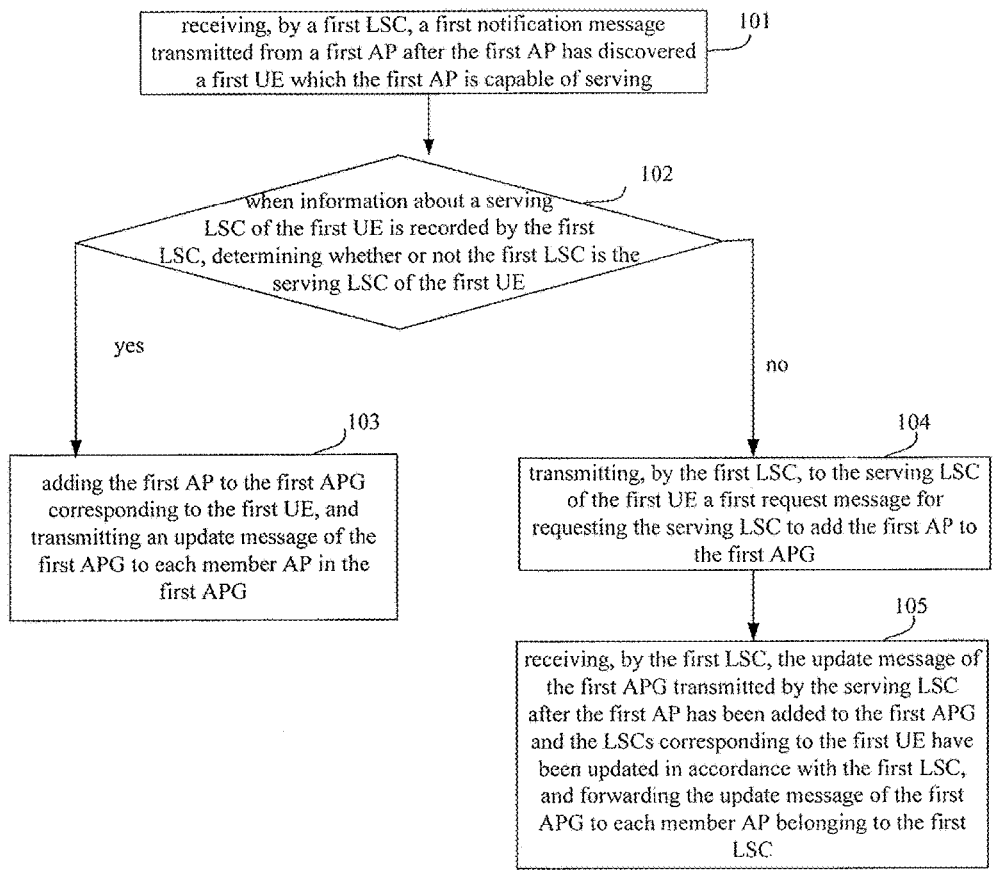

As shown in FIG. 2, in Step 102, when the information about the serving LSC of the first UE has been recorded by the first LSC and the first LSC determines that it is not the serving LSC of the first UE in accordance with the information, the dynamic AP grouping method may include the following steps.

Step 104: transmitting, by the first LSC, to the serving LSC of the first UE a first request message for requesting the serving LSC to add the first AP to the first APG.

Here, the first LSC may determine a current serving LSC of the first UE in accordance with the information about the serving LSC of the first UE maintained locally, and transmit the first request message to the serving LSC. The first request message may carry information about the first AP, the first UE and the first LSC.

Step 105: receiving, by the first LSC, the refresh message of the first APG transmitted by the serving LSC after the first AP has been added to the first APG and the LSCs corresponding to the first UE have been refresh in accordance with the first LSC, and forwarding the refresh message of the first APG to each member AP belonging to the first LSC.

In the embodiments of the present disclosure, upon the receipt of the first request message, the serving LSC may add the first AP into the first APG corresponding to the first UE in accordance with the information about the first AP, the first UE and the first LSC carried in the first request message, and refresh the LSCs corresponding to the first UE in accordance with the first LSC. To be specific, if the LSCs corresponding to the first UE include the first LSC, it is unnecessary to do any actionrefresh, and if the LSCs corresponding to the first UE do not include the first LSC, it is necessary to add the first LSC to the LSCs corresponding to the first UE.

The member AP (i.e., the first AP) is newly added in the first APG, so the serving LSC needs to transmit the refresh message of the first APG to each member A in the first APG. To be specific, for each member AP belonging to the serving LSC, the serving LSC may directly transmit the refresh message of the first APG to the member AP. For each member AP belonging to the non-serving LSC, the serving LSC may transmit the refresh message to the non-serving LSC, and then the non-serving LSC may forward the refresh message to the member AP. In the embodiments of the present disclosure, in Step 105, the first LSC may receive the refresh message of the first APG from the serving LSC, and then forward the refresh message to the member APs in the first APG within the management range of the first LSC, so as to refresh the member APs in the first APG in accordance with the refresh message.

Figure 3:
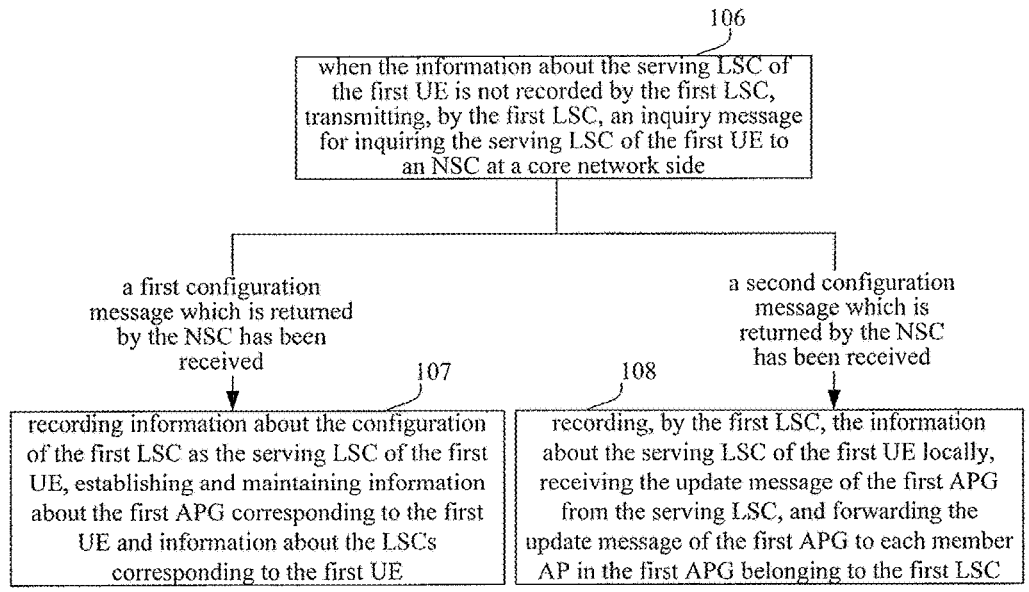

How the first notification message is processed by the first LSC has been described hereinabove when the information about the serving LSC corresponding to the first UE is maintained locally. In the embodiments of the present disclosure, prior to the initialization of the first APG corresponding to the first UE or prior to the addition of the APs within the management range of the first LSC to the APG corresponding to the first UE, the information about the serving LSC corresponding to the first UE may not be recorded locally in the first LSC. At this time, as shown in FIG. 3, subsequent to Step 101, the dynamic AP grouping method may further include the following steps.

Step 106: when the information about the serving LSC of the first UE is not recorded by the first LSC, transmitting, by the first LSC, an inquiry message for inquiring the serving LSC of the first UE to an NSC at a core network side, the first LSC belonging to the NSC.

When the information about the serving LSC of the first UE is not maintained locally, the first LSC needs to transmit the inquiry message to the NSC to which the first LSC belongs, so as to inquire the serving LSC of the first UE. The inquiry message may carry information about the first UE and the first LSC, so as to identify a corresponding device. The inquiry message may further carry information about the first AP.

Step 107: if the first LSC has received from the NSC a first configuration message which is returned by the NSC after the serving LSC of the first UE fails to be found and which is used to indicate the configuration of the first LSC as the serving LSC of the first UE (the first configuration message carries the first APG re-allocated by the NSC and uniquely corresponds to the first UE), recording information about the configuration of the first LSC as the serving LSC of the first UE locally in accordance with the first configuration information, establishing and maintaining information about the first APG corresponding to the first UE and information about the LSCs corresponding to the first UE (the LSCs corresponding to the first UE include the first LSC as the serving LSC and the first APG includes the first AP), and transmitting the refresh message of the first APG to each member AP in the first APG.

Here, the NSC may inquire whether or not the corresponding APG has been allocated for the first UE in accordance with the inquiry message. If no APG has been allocated for the first UE, the NSC may allocate one APG for the first UE through an APG initialization procedure, and then transmit the first configuration message to the first LSC, so as to configure the first LSC which initially reports the first UE as the serving LSC of the first UE. After the establishment and the maintenance of the first APG corresponding to the first UE, the first LSC needs to transmit the refresh message of the first APG to each member AP in the first APG. To be specific, the refresh message may be forwarded by the non-serving LSC of the first UE to each member AP in the first APG belonging to the non-serving LSC, and may be directly transmitted to each member AP in the first APG belonging to the serving LSC (i.e., the first LSC).

Step 108: if the first LSC has received from the NSC a second notification message which is returned after the serving LSC of the first UE has been found and which is used to indicate the serving LSC of the first UE, recording, by the first LSC, the information about the serving LSC of the first UE locally in accordance with the second notification message, receiving the refresh message of the first APG from the serving LSC, and forwarding the refresh message of the first APG to each member AP in the first APG belonging to the first LSC.

Here, if the corresponding APG has been allocated for the first UE in accordance with the inquiry message and the information about the serving LSC corresponding to the first UE has been established, the NSC needs to notify the first LSC of the information to the serving LSC, and forward the inquiry message to the serving LSC. In this way, the serving LSC may add the first AP to the first APG and add a second LSC to the LSCs corresponding to the first UE in accordance with the inquiry message, and then transmit the refresh message of the first APG to each member AP in the first APG. For each member AP belonging to the non-serving LSC, the serving LSC may forward the refresh message of the first APG through the non-serving LSC. Hence, in Step 108, the first LSC may receive the refresh message of the first APG from the serving LSC, and forward it to each member AP belonging to the first LSC, so as to refresh the member APs in the first APG.

How the first notification message received from the first AP is processed by the first LSC to add the member AP in the first APG corresponding to the first UE has been described hereinabove when the information about the serving LSC of the first UE is recorded or not recorded locally. Apart from the addition of the member AP, the refresh procedure of the first APG may further include deleting the member AR In the embodiments of the present disclosure, after the addition of the first AP to the first APG, the first AP within the management range of the first LSC may also be deleted from the first APG. How to delete the first AP from the first APG will be described hereinafter.

Figure 4:
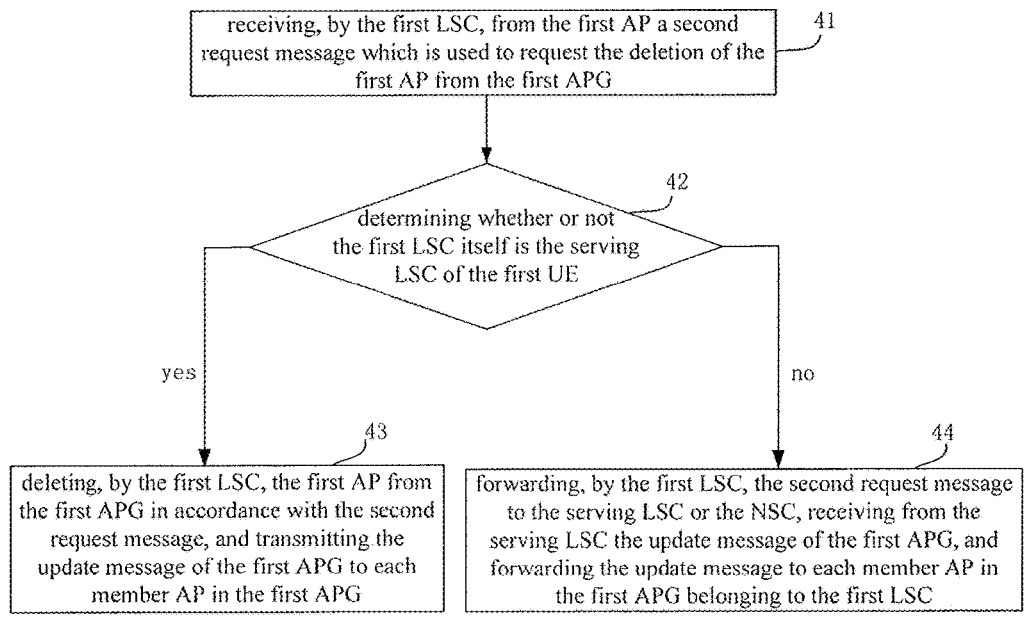

Referring to FIG. 4, the dynamic AP grouping method may further include the following steps.

Step 41: receiving, by the first LSC, from the first AP a second request message which is transmitted when the first AP is to stop serving the first UE and which is used to request the deletion of the first AP from the first APG.

Here, the first AP may not serve the first UE any longer since the first UE has moved out of the coverage of the first AP, or the first UE has requested to reduce the number of APs which are capable of serving the first UE, or due to a working load or a dormant strategy of the first AP. At this time, the first AP may transmit the second request message to the first LSC to which the first AP belongs, so as to request the first LSC to cancel the first AP from the first APG.

Step 42: determining, by the first LSC, whether or not the first LSC itself is the serving LSC of the first UE in accordance with the information about the serving LSC of the first UE recorded locally, if the first LSC itself is the serving LSC of the first UE, proceeding to Step 43, and otherwise proceeding to Step 44.

Step 43: deleting, by the first LSC, the first AP from the first APG in accordance with the second request message, and transmitting the refresh message of the first APG to each member AP in the first APG.

Here, when the first LSC is the serving LSC of the first UE, the first AP in the first APG maintained by the first LSC may be directly deleted from the first APG. After the deletion of the first AP from the first APG, the first LSC may further determine whether or not the number of the member APs in the first APG is 0. When the number of the member APs in the first APG is 0, the first LSC may delete the information about the serving LSC of the first UE locally, delete the information about the first APG corresponding to the first UE and the information about the LSCs corresponding to the first UE, and transmit a cancellation message for cancelling the first APG to the NSC. When the number of the member APs in the first APG is not 0, the first LSC may further determine whether or not the first APG includes the member APs belonging to the first LSC. If the first APG does not include the member APs belonging to the first LSC, the first LSC may delete the information about the serving LSC of the first UE maintained locally, and transmit to the NSC a third request message for requesting the change of the serving LSC of the first UE. The third request message carries the information about the first APG and the information about the LSCs corresponding to the first UE. The NSC may then change the serving LSC corresponding to the first UE in accordance with the third request message. For example, the NSC may configure the LSC with a maximum number of member APs as a new serving LSC, and transmit a notification message for refresh the serving LSC of the first UE to each LSC corresponding to the first UE.

In a possible embodiment of the present disclosure, when the first APG does not include the member APs belonging to the first LSC, the first LSC may select a new serving LSC for the first UE. For example, the first LSC may select one LSC from the non-serving LSCs of the first UE, transmit to the selected LSC a configuration message for configuring the selected LSC as the new serving LSC (the configuration message carries the information about the first APG and the information about the LSCs corresponding to the first UE), and notify the NSC of information about the new serving LSC, so as to enable the NSC to refresh the serving LSC corresponding to the first UE.

Step 44: forwarding, by the first LSC, the second request message to the serving LSC or the NSC, receiving from the serving LSC the refresh message of the first APG transmitted after the deletion of the first AP from the first APG, and forwarding the refresh message to each member AP in the first APG belonging to the first LSC.

Here, when the first LSC is not the serving LSC of the first UE, the first LSC may forward the second request message to the serving LSC, or forward the second request message to the NSC and then the NSC may forward the request message to the serving LSC of the first UE. The second request message is used to request the serving LSC to delete the first AP from the first APG. After the deletion of the first AP from the first APG, the serving LSC may transmit the refresh message of the first APG to each member AP in the first APG, so as to refresh the member APs. For each member AP belonging to the non-serving LSC, the serving LSC may transmit the refresh message of the first APG to the member AP via the non-serving LSC.

In the embodiments of the present disclosure, the first LSC may receive different messages and perform different procedures depending on whether or not the first LSC is the serving LSC or the non-serving LSC, which will be described hereinafter.

Figure 5:
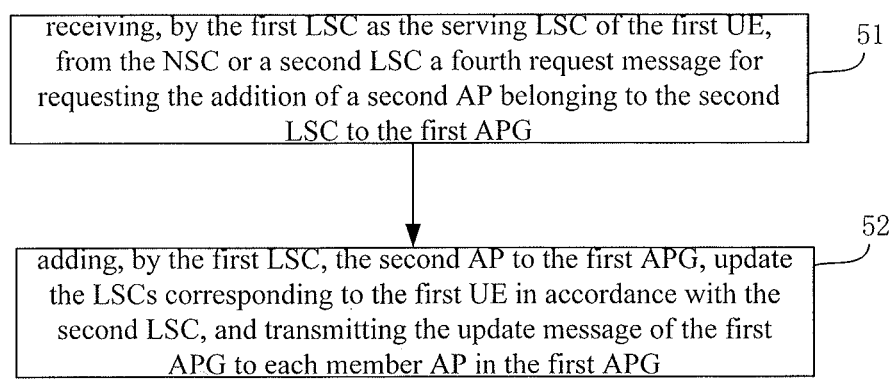

When the first LSC is the serving LSC of the first UE, the first LSC may receive the request message forwarded by the non-serving LSC or the NSC for deleting a certain member AP from the first APG corresponding to the first UE. At this time, as shown in FIG. 5, when adding the member AP, the dynamic AP grouping method may further include the following steps.

Step 51: receiving, by the first LSC as the serving LSC of the first UE, from the NSC or a second LSC a fourth request message for requesting the addition of a second AP belonging to the second LSC to the first APG.

Step 52: adding, by the first LSC, the second AP to the first APG, refresh the LSCs corresponding to the first UE in accordance with the second LSC, and transmitting the refresh message of the first APG to each member AP in the first APG.

Here, in Step 52, it is necessary to refresh the LSCs corresponding to the first UE maintained locally in accordance with the second LSC. To be specific, if the LSCs corresponding to the first UE include the second LSC, it is unnecessary to refresh perform any action, and if the LSCs corresponding to the first UE do not include the second LSC, it is necessary to add the second LSC to the LSCs corresponding to first UE maintained locally.

Figure 6:
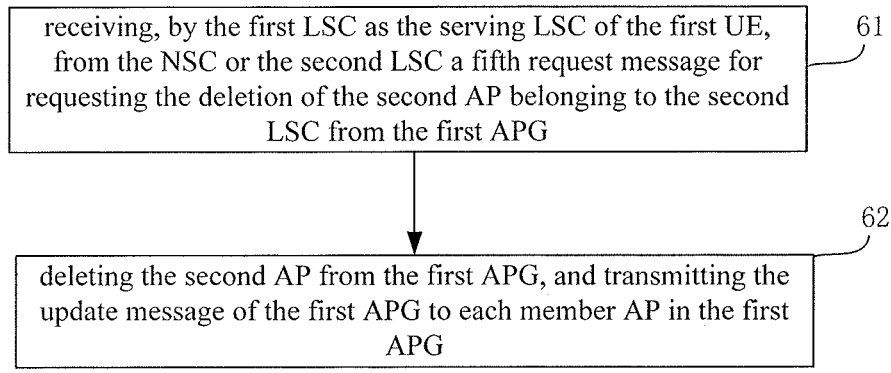

As shown in FIG. 6, when deleting the member AP, the dynamic AP grouping method may further include the following steps.

Step 61: receiving, by the first LSC as the serving LSC of the first UE, from the NSC or the second LSC a fifth request message for requesting the deletion of the second AP belonging to the second LSC from the first APG.

Step 62: deleting the second AP from the first APG, and transmitting the refresh message of the first APG to each member AP in the first APG.

Here, in Step 62, after the deletion of the second AP, the first LSC may further determine whether or not the first APG includes the member AP belonging to the second LSC, and if the first APG does not include the member AP belonging to the second LSC, delete the second LSC from the LSCs corresponding to the first UE maintained locally, so as to refresh the LSCs corresponding to the first UE.

When the first LSC is the non-serving LSC of the first UE, the first LSC may receive from the NSC a second configuration message for configuring the first LSC as a new serving LSC, and the second configuration message carries the information about the first PAG and the information about the LSCs corresponding to the first UE. At this time, the first LSC may configure itself as the new serving LSC of the first UE in accordance with the second configuration message, maintain locally the information about the serving LSC of the first UE, and establish the information about the first APG corresponding to the first UE and the information about the LSCs corresponding to the first UE. For another example, the first LSC may further receive from the NSC a third configuration message for refresh the serving LSC of the first UE, and the third configuration message carries information about the new serving LSC. At this time, the first LSC may refresh the information about the serving LSC of the first UE maintained locally in accordance with the third configuration message.

In the above embodiments of the present disclosure, after the member AP has been deleted from the first APG, the serving LSC (e.g., the first LSC) needs to transmit the refresh message of the first APG to each member AP in the first APG. To be specific, for each member AP belonging to the non-serving LSC, the serving LSC may forward the refresh message of the first APG to the member AP via the non-serving LSC, and for each member AP belonging to the serving LSC, the serving LSC may directly transmit the refresh message of the first APG to the member AP.

The processing procedures of the first LSC have been described in the above embodiments when different messages are received. As compared with the traditional mode where the services are provided to the UE in a network-centered manner, the services are provided to the UE in a UE-centered manner through the dynamic AP grouping method in the embodiments of the present disclosure. As a result, it is able to prevent the UE from frequently acquiring the network environment, thereby to provide the data transmission services to the UE at a low speed or in a stationary state through the APG. In addition, during the movement of the UE, it is able to transmit the services through the dynamic adjustment of the APG and the coordination in the APG, thereby to change the AP and reduce the number of the handover operations made by the UE. Further, the UE may not perform the handover operation in the APG via the core network, so it is able to reduce the signaling load of the core network, and adjust in real time the AP which is capable of serving the UE in accordance with the network condition acquired dynamically.

A dynamic AP grouping method at an NSC side will be described hereinafter.

Figure 7:
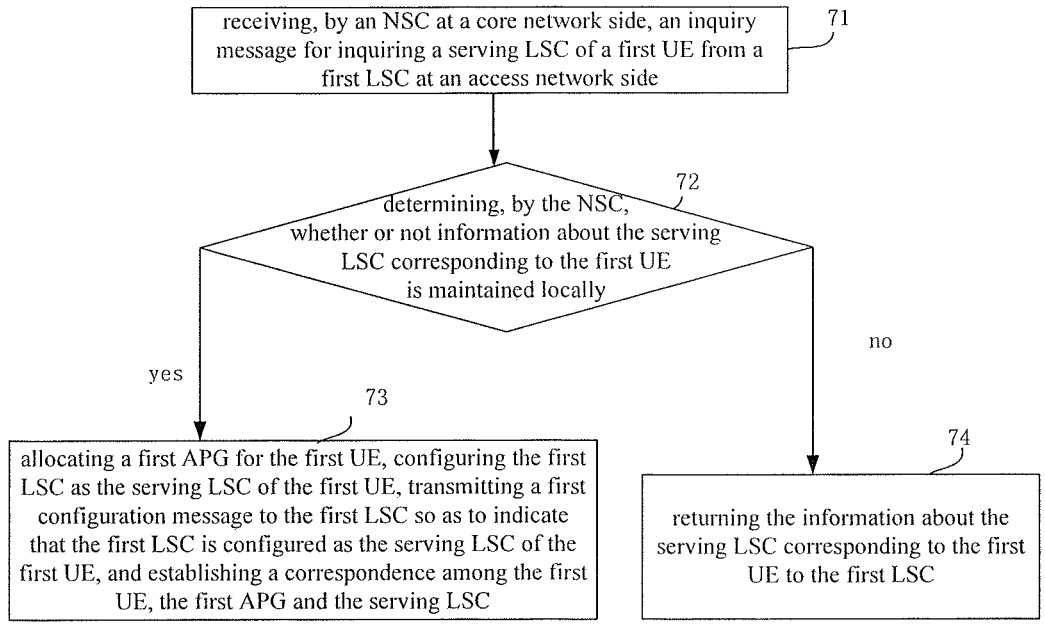
FIG. 7 is a flow chart of a dynamic AP grouping method at an NSC side according to one embodiment of the present disclosure.

Referring to FIG. 7, the present disclosure provides in some embodiments a dynamic AP grouping method for an NSC in a UDN, which may include the following steps.

Step 71: receiving, by the NSC at a core network side, an inquiry message for inquiring a serving LSC of a first UE from a first LSC at an access network side.

Here, after the first AP within a management range of the first LSC has found the first UE which the first AP is capable of serving, the first AP may transmit a first notification message to the first LSC. The first AP is one of the APs belonging to the first LSC. The first LSC may inquire whether or not information about a serving LSC of the first UE is maintained locally in accordance with the first notification message. If the information about the serving LSC of the first UE is not maintained locally, the first LSC may transmit the inquiry message to the NSC to which the first LSC belongs, so as to determine whether or not the NSC has allocated a corresponding APG for the first UE. The inquiry message may carry information about the first UE and the first LSC for identifying a corresponding device. In addition, the inquiry message may carry information about the first AP.

Step 72: determining, by the NSC, whether or not information about the serving LSC corresponding to the first UE is maintained locally in accordance with the inquiry message.

Here, if the NSC has allocated the APG for a certain UE and the APG has not been cancelled yet, the NSC may maintain a correspondence among the UE, the APG and the serving LSC locally. Hence, the NSC may determine whether or not the information about the serving LSC of the first UE is maintained in accordance with whether or not the correspondence is maintained locally.

Step 73: when the information about the serving LSC corresponding to the first UE is not maintained locally, allocating a first APG for the first UE, configuring the first LSC as the serving LSC of the first UE, transmitting a first configuration message to the first LSC so as to indicate that the first LSC is configured as the serving LSC of the first UE, and establishing a correspondence among the first UE, the first APG and the serving LSC, the first configuration message carrying information about the first APG.

Here, if the information about the serving LSC of the first UE is not maintained locally, it means that the APG has not been allocated for the first UE yet. At this time, the NSC may allocate one APG for the first UE (to be specific, the allocated APG may be identified by an APG ID). In addition, the NSC may configure the first LSC as the serving LSC of the first UE, and then establish and maintain the correspondence among the first UE, the first APG and the serving LSC locally. Within a management range of an identical NSC, different APGs are allocated for the UEs, i.e., there is a one-to-one correspondence between the APGs and the UEs. The NSC may further transmit the first configuration message to the first LSC, so that the first LSC may configure itself as the serving LSC of the first UE in accordance with the first configuration message, and establish and maintain locally information about the first APG corresponding to the first UE and the information about the LSCs corresponding to the first UE. The LSCs corresponding to the first UE include the first LSC as the serving LSC, and the first APG includes the first AP.

Step 74: when the information about the serving LSC corresponding to the first UE is maintained locally, returning the information about the serving LSC corresponding to the first UE to the first LSC.

Here, if the information about the serving LSC of the first UE is maintained locally, it means that the NSC has allocated the APG for the first UE. At this time, the NSC may acquire the serving LSC corresponding to the first UE in accordance with the correspondence maintained locally, and return the information about the serving LSC to the first LSC, so that the first LSC may acquire the information about the serving LSC and communicate with the serving LSC for requesting the addition of the first AP to the APG corresponding to the first UE.

Through the above-mentioned steps, the NSC may allocate the APG for each UE within its management range, and configure the serving LSC for each UE. The APG of the UE may be maintained by the serving LSC. In this way, it is able to achieve the dynamic grouping of the APs.

In Step 74, the NSC may notify the first LSC of the information about the serving LSC of the first UE, so that the first LSC may subsequently transmit a request message to the serving LSC, so as to request the addition of the first AP to the APG corresponding to the first UE. In a possible embodiment of the present disclosure, the NSC may also directly transmit the request message to the serving LSC. At this time, subsequent to Step 74, the dynamic AP grouping method may further include transmitting to the serving LSC a second request message for adding the first AP to the first APG corresponding to the first UE and adding the first LSC to the LSCs corresponding to the first UE.

Hence, the serving LSC may add the first AP to the first APG corresponding to the first UE and add the first LSC to the LSCs corresponding to the first UE in accordance with the second request message. Then, the serving LSC may transmit the refresh message of the first APG to each member AP in the first APG, so as to refresh the first APG by the respective member APs.

In some embodiments of the present disclosure, the serving LSC of the first UE may be changed in accordance with the practical need. At this time, the dynamic AP grouping method may further include: receiving, by the NSC, from the serving LSC of the first UE a third request message for requesting the change of the serving LSC of the first UE, the third request message carrying the information about the first APG and the information about the LSCs corresponding to the first UE; and selecting, by the NSC, a new serving LSC of the first UE from the LSCs corresponding to the first UE in accordance with the third request message, transmitting to the new serving LSC a second configuration message carrying the information about the first APG and the information about the LSCs corresponding to the first UE, and transmitting a refresh message of the serving LSC of the first UE to the LSCs corresponding to the first UE, the refresh message carrying information about the new serving LSC.

Here, an LSC having a maximum number of member APs may be selected from the LSCs corresponding to the first UE as the new serving LSC, i.e., if a maximum number of member APs in the first APG belongs to an LSC, this LSC may be selected as the new serving LSC. Of course, an LSC to which the member AP currently providing the data transmission services to the UE belongs may be selected as the new serving LSC. When the data transmission services are currently provided to the first UE through a plurality of member APs, an LSC to which any one of the member APs belongs may be selected as the new serving LSC.

In some embodiments of the present disclosure, after the first APG has been allocated for the first UE, the NSC may further cancel the first APG. For example, when the first UE has moved out of the coverage of the UDN to which the NSC belongs or the first UE has switched to a traditional cellular network, the first AP may be cancelled. Usually, the cancellation of the APG may be initiated by the serving LSC. Hence, the dynamic AP grouping method may further include: receiving, by the NSC, from the serving LSC of the first UE a cancellation message for cancelling the first APG; and recovering, by the NSC, the first APG allocated for the first UE in accordance with the cancellation message, and deleting the correspondence among the first UE, the first APG and the serving LSC maintained locally.

The dynamic AP grouping method at the NSC side has been described hereinabove. A dynamic AP grouping method at an AP side will be described hereinafter.

Figure 8:
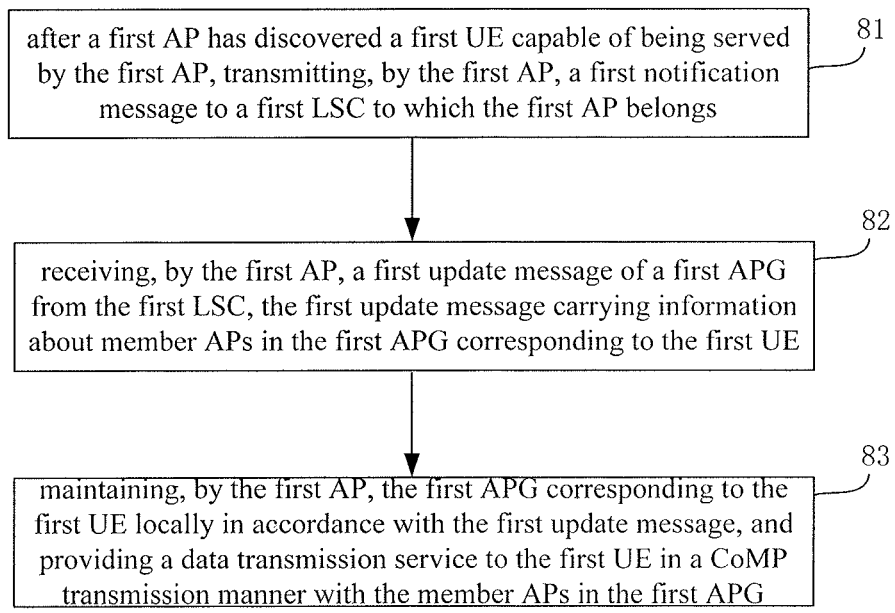
FIG. 8 is a flow chart of a dynamic AP grouping method at an AP side according to one embodiment of the present disclosure.

Referring to FIG. 8, the present disclosure provides in some embodiments a dynamic AP grouping method for an AP in a UDN, which may include the following steps.

Step 81: after a first AP has found a first UE capable of being served by the first AP, transmitting, by the first AP, a first notification message used to notify that the first UE has been found to a first LSC to which the first AP belongs.

Step 82: receiving, by the first AP, a first refresh message of a first APG from the first LSC, the first refresh message carrying information about member APs in the first APG corresponding to the first UE, the first APG including the member APs which are currently capable of serving the first UE.

Here, upon the receipt of the first notification message, the first LSC may, as mentioned above, request the serving LSC of the first UE to add the first AP to the corresponding APG (the first APG). After the first AP has been added to the first APG, the serving LSC may transmit the first refresh message to the first AP via the first LSC. The first LSC may or may not be the serving LSC of the first UE. When the first LSC is the serving LSC of the first UE, the first refresh message may be directly transmitted from the first LSC to the first AP, and when the first LSC is not the serving LSC of the first UE, the first refresh message may be forwarded by the serving LSC to the first AP via the first LSC.

Step 83: maintaining, by the first AP, the first APG corresponding to the first UE locally in accordance with the first refresh message, and providing a data transmission service to the first UE in a CoMP transmission manner with the member APs in the first APG.

Subsequent to Step 83, the first AP may further dynamically refresh the APG. At this time, the dynamic AP grouping method may further include: receiving, by the first AP, a second refresh message of the first APG from the first LSC, the second refresh message carrying the refreshed first APG; and updating, by the first AP, the first APG maintained locally in accordance with the second refresh message.

The first AP may not continue to serve the first UE when, for example, the first AP has a high working load, a dormant period of the first AP is expired, the first UE has moved out of the coverage of the first AP, or the signal quality fails to meet a predetermined requirement due to a too large distance between the first AP and the first UE. At this time, the dynamic AP grouping method further includes transmitting, by the first AP, to the first LSC a request message for requesting the deletion of the first AP from the first APG, and deleting the first APG maintained locally. Through the request message, the serving LSC of the first UE may be triggered to delete the first AP from the first APG, so as to refresh the first APG.

Through the above-mentioned steps, the information about the member APs in the first APG is maintained by the first AP locally. As a result, it is able to achieve a dynamic AP grouping in a UE-centered manner and dynamically refresh the APG serving the UE, thereby to prevent the UE from frequently acquiring the network environment and reduce the signaling load of the core network.

The dynamic AP grouping methods at the LSC side, the NSC side and the AP side have been described hereinabove. The LSC, the NSC and the AP for implementing the dynamic AP grouping methods will be described hereinafter.

Figure 9A:
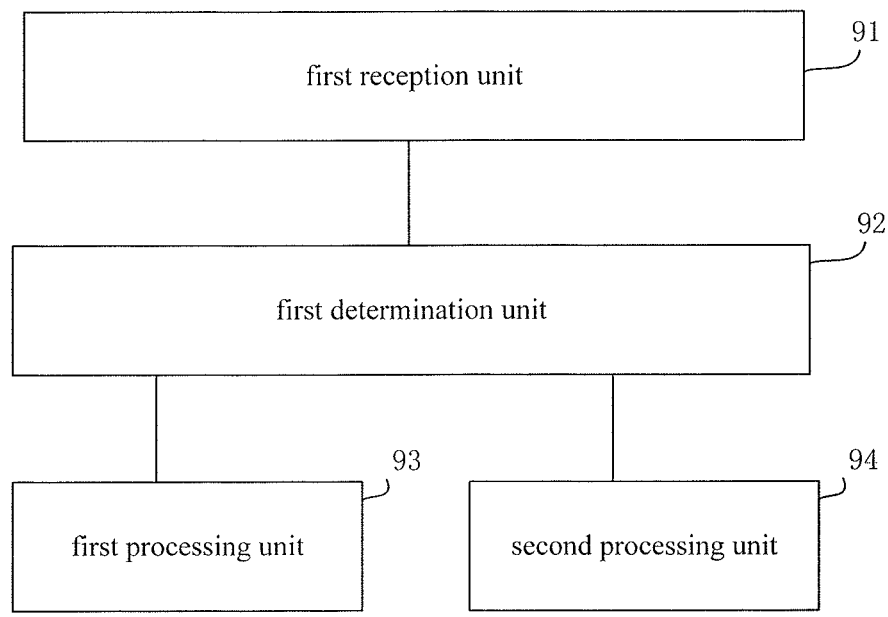
FIG. 9A is a schematic view showing a first LSC according to one embodiment of the present disclosure.

The present disclosure provides in some embodiments an LSC (for convenience, it may be called as the first LSC). The first LSC is arranged at an access network side of the UDN, and capable of communicating with the other LSCs in the UDN and an NSC at a core network side of the UDN. Referring to FIG. 9A, the first LSC may include: a first reception unit 91 configured to receive a first notification message transmitted from a first AP after the first AP has found a first UE which the first AP is capable of serving, the first AP being an AP belonging to the first LSC; a first determination unit 92 configured to, when information about a serving LSC of the first UE is recorded by the first LSC, determine whether or not the first LSC is the serving LSC of the first UE in accordance with the information, information about a first APG corresponding to the first UE and LSCs corresponding to the first UE being maintained on the serving LSC of the first UE, the first APG including member APs which are currently capable of serving the first UE, the LSCs corresponding to the first UE including LSCs to which each member AP belongs; and a first processing unit 93 configured to, when the first determination unit 92 has determined that the first LSC is the serving LSC of the first UE, add the first AP to the first APG corresponding to the first UE, and transmit a refresh message of the first APG to each member AP in the first APG, the refresh message carrying information about the member APs in the first APG.

When the first LSC may not be the serving LSC of the first UE, the first LSC may further include: a second processing unit configured to, when a first determination unit has determined that the first LSC is not the serving LSC of the first UE, transmit to the serving LSC of the first UE a first request message for requesting the addition of the first AP to the first APG; a second reception unit configured to receive from the serving LSC a refresh message of the first APG transmitted after the first AP has been added to the first APG and LSCs corresponding to the first UE has been refresh in accordance with the first LSC; and a first transmission unit configured to forward the refresh message of the first APG to each member AP belonging to the first LSC.

When the information about the serving LSC of the first UE may not be maintained by the first LSC locally, it is impossible for the first determination unit to determine whether or not the first LSC is the serving LSC of the first UE. At this time, the first LSC may further include: a second transmission unit configured to, when the first reception unit has received the first notification message and the information about the serving LSC of the first UE is not recorded by the first LSC, transmit to an NSC at a core network side an inquiry message for inquiring the serving LSC of the first UE, the first LSC belonging to the NSC; and a third processing unit configured to receive from the NSC a first configuration message which is returned by the NSC after the serving LSC of the first UE fails to be found and which is used to indicate the configuration of the first LSC as the serving LSC of the first UE (the first configuration message carries an APG uniquely corresponding to the first UE and re-allocated by the NSC), record information about the configuration of the first LSC as the serving LSC of the first UE locally in accordance with the first configuration information, establish and maintain information about the first APG corresponding to the first UE and information about the LSCs corresponding to the first UE (the LSCs corresponding to the first UE include the first LSC as the serving LSC and the first APG includes the first AP), and transmit the refresh message of the first APG to each member AP in the first APG. The third processing unit is further configured to, when the first LSC has received from the NSC a second notification message which is returned after the serving LSC of the first UE has been found and which is used to indicate the serving LSC of the first UE, record the information about the serving LSC of the first UE locally in the first LSC in accordance with the second notification message, receive the refresh message of the first APG from the serving LSC, and forward the refresh message of the first APG to each member AP in the first APG belonging to the first LSC.

In order to delete the member AP from the first APG, the first LSC may further include: a third reception unit configured to receive from the first AP a second request message which is transmitted when the first AP is to stop serving the first UE and which is used to request the deletion of the first AP from the first APG; and a fourth processing unit configured to determine whether or not the first LSC itself is the serving LSC of the first UE in accordance with the recorded information about the serving LSC of the first UE, when the first LSC itself is the serving LSC of the first UE, delete the first AP from the first APG in accordance with the second request message and transmit the refresh message of the first APG to each member AP in the first APG, and when the first LSC is not the serving LSC of the first UE, forward the second request message to the serving LSC or the NSC, receive from the serving LSC the refresh message of the first APG transmitted after the deletion of the first AP from the first APG, and forward the refresh message to each member AP in the first APG belonging to the first LSC.

When the first LSC is the serving LSC of the first UE, the fourth processing unit may be further configured to achieve such functions as maintaining the LSCs corresponding to the first UE and cancelling the first APG. At this time, subsequent to the deletion of the first AP from the first APG, the fourth processing unit is further configured to: determine whether or not the number of the member APs in the first APG is 0; when the number of the member APs in the first APG is 0, delete the information about the serving LSC of the first UE locally, delete the information about the first APG corresponding to the first UE and the information about the LSCs corresponding to the first UE, and transmit a cancellation message for cancelling the first APG to the NSC; and when the number of the member APs in the first APG is not 0, determine whether or not the first APG includes the member APs belonging to the first LSC, when the first APG does not include the member APs belonging to the first LSC, delete the information about the serving LSC of the first UE maintained locally, and transmit to the NSC a third request message for requesting the change of the serving LSC of the first UE. The third request message carries the information about the first APG and the information about the LSCs corresponding to the first UE.

When the first LSC is the serving LSC, in order to maintain the first APG in accordance with the request message from the other LSCs, it may further include: a fourth reception unit configured to receive from the NSC or a second LSC a fourth request message for requesting the addition of a second AP belonging to the second LSC to the first APG; a fifth processing unit configured to add the second AP to the first APG, refresh the LSCs corresponding to the first UE in accordance with the second LSC, and transmit the refresh message of the first APG to each member AP in the first APG; a fifth reception unit configured to receive from the NSC or the second LSC a fifth request message for requesting the deletion of the second AP belonging to the second LSC from the first APG; and a sixth processing unit configured to delete the second AP from the first APG, and transmit the refresh message of the first APG to each member AP in the first APG.

Here, the sixth processing unit is further configured to, after the deletion of the second AP from the first APG, determine whether or not the first APG includes the member AP belonging to the second LSC, and when the first APG does not include the member AP belonging to the second LSC, delete the second LSC from the LSCs corresponding to the first UE.

In some embodiments of the present disclosure, when the first LSC is the non-serving LSC, in order to achieve the relevant interaction with the NSC, the first LSC may further include: a seventh processing unit configured to receive from the NSC a second configuration message for configuring the first LSC as a new serving LSC, the second configuration message carrying the information about the first PAG and the information about the LSCs corresponding to the first UE, configure the first LSC as the new serving LSC of the first UE in accordance with the second configuration message, maintain locally the information about the serving LSC of the first UE in the first LSC, and establish the information about the first APG corresponding to the first UE and the information about the LSCs corresponding to the first UE; and an eighth processing unit configured to receive from the NSC a third configuration message for refresh the serving LSC of the first UE, the third configuration message carrying information about the new serving LSC, and refresh the information about the serving LSC of the first UE maintained locally in the first LSC in accordance with the third configuration message.

Figure 9B:
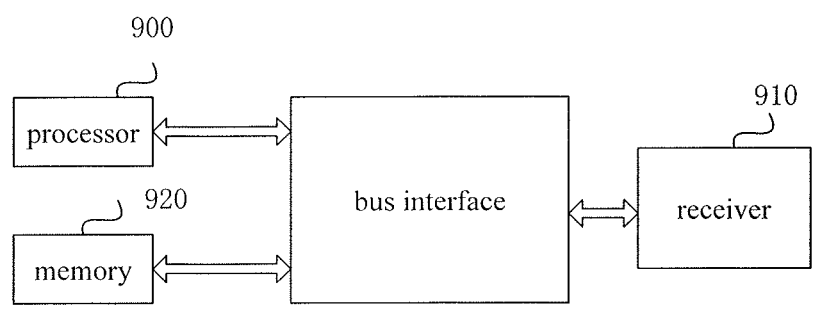
FIG. 9B is another schematic view showing the first LSC according to one embodiment of the present disclosure.

Referring to FIG. 9B, the present disclosure provides in some embodiments an LSC (i.e., a first LSC), which includes a receiver 910 and a processor 900. The receiver 910 is configured to receive a first notification message transmitted from a first AP after the first AP has found a first UE which the first AP is capable of serving, the first AP being an AP belonging to the first LSC. The processor 900 is configured to: when information about a serving LSC of the first UE is recorded by the first LSC, determine whether or not the first LSC is the serving LSC of the first UE in accordance with the information, information about a first APG corresponding to the first UE and LSCs corresponding to the first UE being maintained on the serving LSC of the first UE, the first APG including member APs which are currently capable of serving the first UE, the LSCs corresponding to the first UE including LSCs to which each member AP belongs; and when the first LSC is the serving LSC of the first UE, add the first AP to the first APG corresponding to the first UE, and transmit a refresh message of the first APG to each member AP in the first APG, the refresh message carrying information about the member APs in the first APG.

The first LSC may further include a memory 920 configured to store therein downlink data or any other paging-related data.

The processor 900 and the memory 920 may be connected to the receiver 910 via a bus interface. Bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the receiver 910 may include more than one elements for communication with any other devices over a transmission medium. The processor 900 may take charge of managing the bus architecture and general processings. The memory 920 may store therein data for the operation of the processor.

Figure 10A:
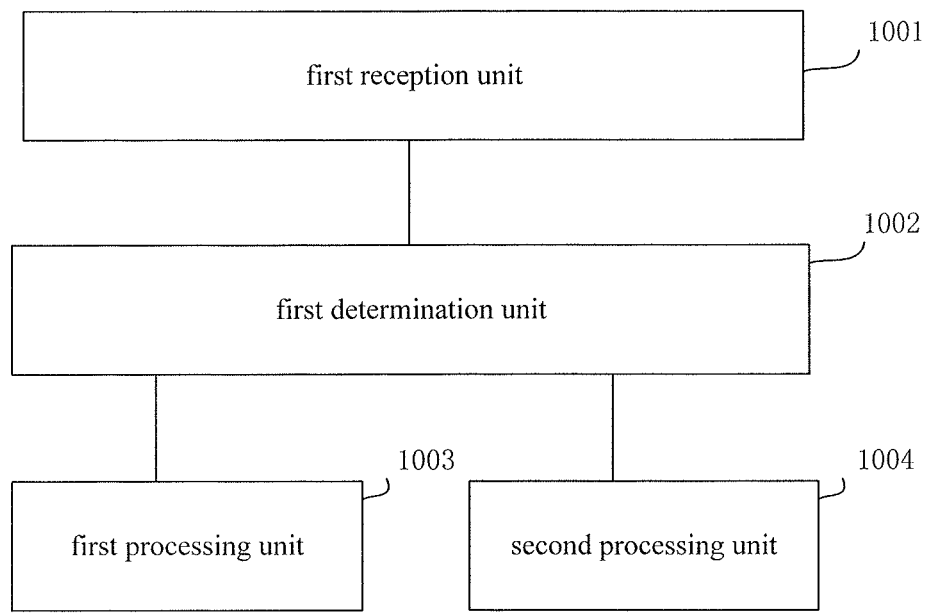
FIG. 10A is a schematic view showing an NSC according to one embodiment of the present disclosure.

Referring to FIG. 10A, the present disclosure provides in some embodiments an NSC at a core network side, which may include: a first reception unit 1001 configured to receive an inquiry message for inquiring a serving LSC of a first UE from a first LSC at an access network side, the first LSC belonging to the NSC; a first determination unit 1002 configured to determine whether or not information about the serving LSC corresponding to the first UE is maintained locally in accordance with the inquiry message; a first processing unit 1003 configured to, when the information about the serving LSC corresponding to the first UE is not maintained locally, allocate a first APG for the first UE, configure the first LSC as the serving LSC of the first UE, transmit a first configuration message to the first LSC so as to indicate that the first LSC is configured as the serving LSC of the first UE, and establish a correspondence among the first UE, the first APG and the serving LSC, the first configuration message carrying information about the first APG; and a second processing unit 1004 configured to, when the information about the serving LSC corresponding to the first UE is maintained locally, return the information about the serving LSC corresponding to the first UE to the first LSC.

Here, the inquiry message further carries information about a first AP of the first UE, and the first AP belongs to the first LSC. The second processing unit 1004 is further configured to, after returning the information about the serving LSC corresponding to the first UEU to the first LSC, transmit to the serving LSC a second request message for adding the first AP to the first APG corresponding to the first UE and adding the first LSC to the LSCs corresponding to the first UE.

According to the embodiments of the present disclosure, through the above-mentioned units, it is able for the NSC to allocate the corresponding APG for the first UE, or return the information about the serving LSC of the first UE to the LSC.

In some embodiments of the present disclosure, the NSC may further change the serving LSC of a certain UE. To be specific, the NSC may further include: a second reception unit configured to receive from the serving LSC of the first UE a third request message for requesting the change of the serving LSC of the first UE, the third request message carrying the information about the first APG and the information about the LSCs corresponding to the first UE; and a third processing unit configured to select a new serving LSC of the first UE from the LSCs corresponding to the first UE in accordance with the third request message, transmit to the new serving LSC a second configuration message carrying the information about the first APG and the information about the LSCs corresponding to the first UE, and transmit a refresh message of the serving LSC of the first UE to the LSCs corresponding to the first UE, the refresh message carrying information about the new serving LSC.

In some embodiments of the present disclosure, the NSC may further cancel the APG of a certain UE. To be specific, the NSC may further include: a third reception unit configured to receive from the serving LSC of the first UE a cancellation message for cancelling the first APG; and a fourth processing unit configured to recover the first APG allocated for the first UE in accordance with the cancellation message, and delete the correspondence among the first UE, the first APG and the serving LSC maintained locally.

Figure 10B:
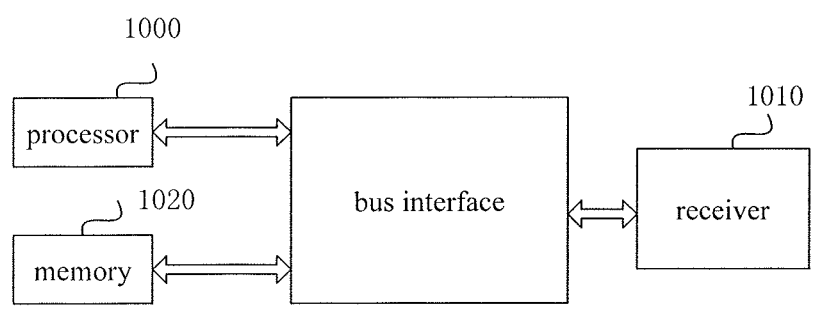
FIG. 10B is another schematic view showing the NSC according to one embodiment of the present disclosure.

Referring to FIG. 10B, the present disclosure provides in some embodiments an NSC, which may include a receiver 1010 and a processor 1000. The receiver 1010 is configured to receive an inquiry message for inquiring a serving LSC of a first UE from a first LSC at an access network side, the first LSC belonging to the NSC. The processor 1000 is configured to: determine whether or not information about the serving LSC corresponding to the first UE is maintained locally in accordance with the inquiry message; when the information about the serving LSC corresponding to the first UE is not maintained locally, allocate a first APG for the first UE, configure the first LSC as the serving LSC of the first UE, transmit a first configuration message to the first LSC so as to indicate that the first LSC is configured as the serving LSC of the first UE, and establish a correspondence among the first UE, the first APG and the serving LSC, the first configuration message carrying information about the first APG; and when the information about the serving LSC corresponding to the first UE is maintained locally, return the information about the serving LSC corresponding to the first UE to the first LSC.

The NSC may further include a memory 1020 configured to store therein downlink data or any other paging-related data.

The processor 1000 and the memory 1020 may be connected to the receiver 1010 via a bus interface. Bus architecture may include a number of buses and bridges connected to each other, so as to connect various circuits for one or more processors 1000 and one or more memories 1020. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the receiver 1010 may include more than one elements for communication with any other devices over a transmission medium. The processor 1000 may take charge of managing the bus architecture and general processings. The memory 1020 may store therein data for the operation of the processor.

Figure 11A:
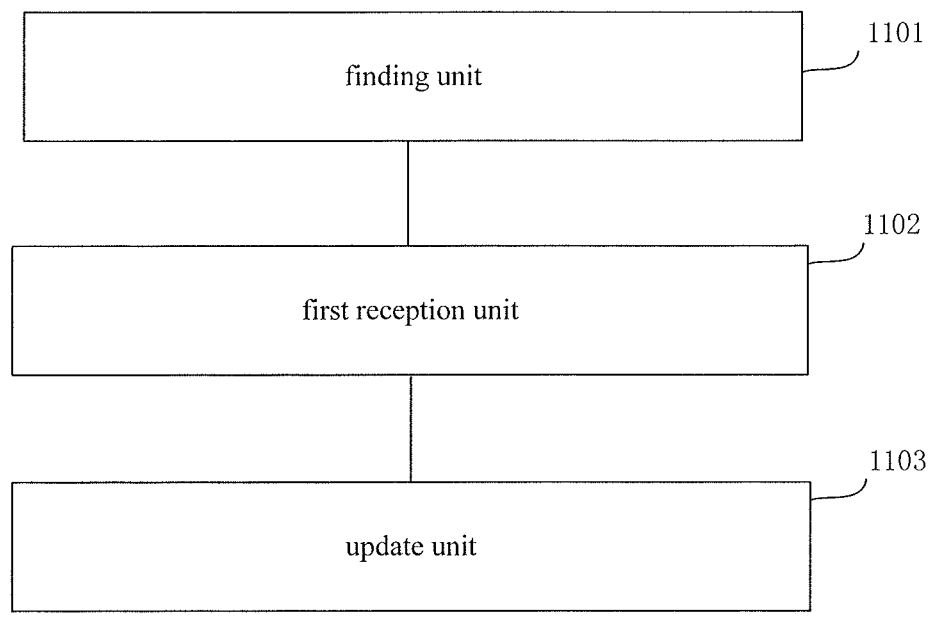
FIG. 11A is a schematic view showing a first AP according to one embodiment of the present disclosure.

Referring to FIG. 11A, the present disclosure provides in some embodiments an AP (for convenience, called as a first AP), which may include: a finding unit 1101 configured to find a first UE capable of being served by the first AP and transmit a first notification message to a first LSC to which the first AP belongs; a first reception unit 1102 configured to receive a first refresh message of a first APG from the first LSC, the first refresh message carrying information about member APs in the first APG corresponding to the first UE, the first APG including the member APs which are currently capable of serving the first UE; and a refresh unit 1103 configured to maintain the first APG corresponding to the first UE locally in accordance with the first refresh message, and provide a data transmission service to the first UE in a CoMP transmission manner with the member APs in the first APG.

Here, in order to refresh or delete the first APG maintained locally, the first AP may further include: a second reception unit configured to receive a second refresh message of the first APG from the first LSC, the second refresh message carrying the refreshed first APG. The refresh unit is further configured to refresh the first APG maintained locally in accordance with the second refresh message.

Here, the finding unit is further configured to transmit, when the first AP will soon stop service for the first UE, to the first LSC a request message for requesting the deletion of the first AP from the first APG, and delete the first APG maintained locally.

Figure 11B:
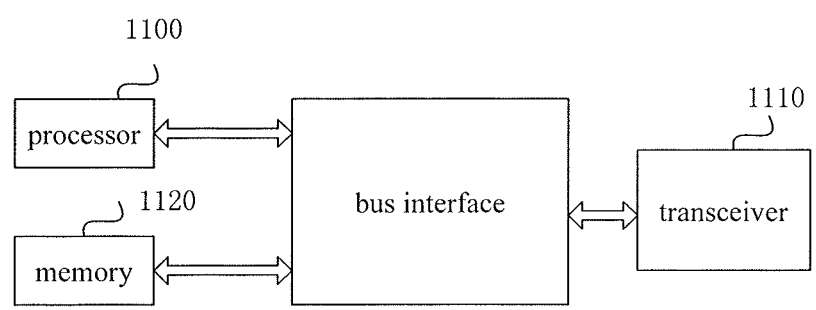
FIG. 11B is another schematic view showing the first AP according to one embodiment of the present disclosure.

Referring to FIG. 11B, the present disclosure provides in some embodiments another kind of AP (a first AP), which may include a transceiver 1110 and a processor 1100. The transceiver 1110 is configured to find a first UE capable of being served by the first AP, transmit a first notification message to a first LSC to which the first AP belongs, and receive a first refresh message of a first APG from the first LSC, the first refresh message carrying information about member APs in the first APG corresponding to the first UE, the first APG including the member APs which are currently capable of serving the first UE. The processor 1100 is configured to maintain the first APG corresponding to the first UE locally in accordance with the first refresh message, and provide a data transmission service to the first UE in a CoMP transmission manner with the member APs in the first APG.

The first AP may further include a memory 1120 configured to store therein downlink data or any other paging-related data.

The processor 1100 and the memory 1120 may be connected to the transceiver 1110 via a bus interface. Bus architecture may include a number of buses and bridges connected to each other, so as to connect various circuits for one or more processors 1100 and one or more memories 1120. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the transceiver 1110 may include more than one elements for communication with any other devices over a transmission medium. The processor 1100 may take charge of managing the bus architecture and general processings. The memory 1120 may store therein data for the operation of the processor.

The structures of the LSC, the NSC and the AP as well as the methods implemented thereby have been described hereinabove.

Figure 12:
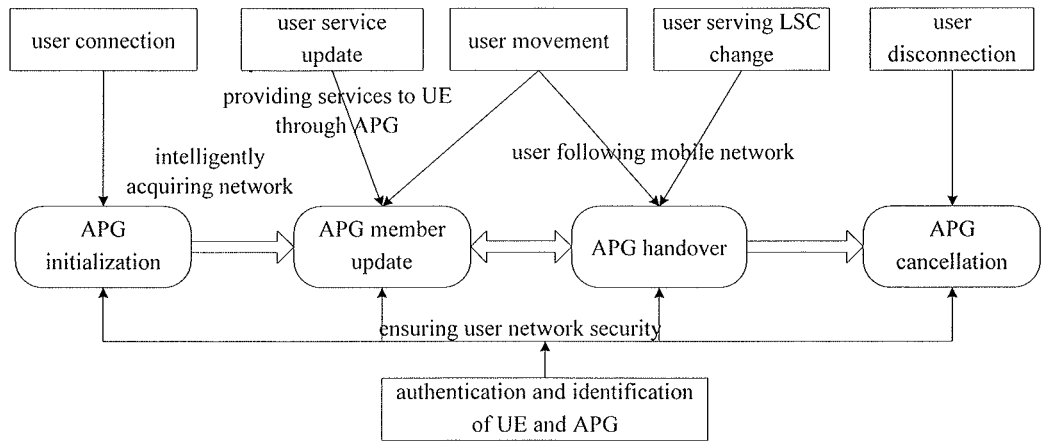
FIG. 12 is a schematic view showing a DAPGing procedure according to one embodiment of the present disclosure.

Referring to FIG. 12 and Table 1, the DAPGing method in the embodiments of the present disclosure may be used to achieve the following functions: APG initialization, APG refresh, inter-NSC APG handover, and APG cancellation.

The APG refresh function includes refresh the member APs in an LSC and refresh the member APs between the LSCs. Through changing the member APs in the APG, it is able to move a wireless link from between the UE and one AP to between the UE and another AP.

The APG handover function refers to the inter-NSC APG handover. Because the APG ID in each NSC is unique, after the UE has moved to the coverage of a new NSC, a new APG ID may be acquired, and meanwhile the member APs in the APG may be re-organized.

The APG cancellation function includes a handover procedure between the APG and a traditional cellular network, i.e., the handover procedure from the APG to the traditional cellular network, or the handover procedure from the traditional cellular network to the APG.

TABLE 1

| Mobility Scenario | Handover mode | Description |
| --- | --- | --- |
| Intra-LSC | APG Refresh | Through changing the member APs in the APG, radio links may be moved from between the UE and one AP to between the UE and another AP |
| Inter-LSC | | |
| Inter-NSC | APG Handover | The APG ID in Intra-NSC is unique, so after the UE has moved to the coverage of a new NSC, a new APG ID may be acquired, and meanwhile the member APs in the APG may be re-organized |
| Mobility management | APG cancellation | Handover procedure between the APG and the traditional cellular |

TABLE 1-continued

| Mobility Scenario | Handover mode | Description |
| --- | --- | --- |
| between APG and traditional cellular system | | network, i.e., the handover procedure from the APG to the traditional cellular network, or the handover procedure from the traditional cellular network to the APG |

For ease of understanding, a message interaction procedure among the devices for implementing the DAPGing method will be described hereinafter in conjunction with the above-mentioned functions and the specific scenarios.

Scenario 1: APG Initialization

Figure 13:
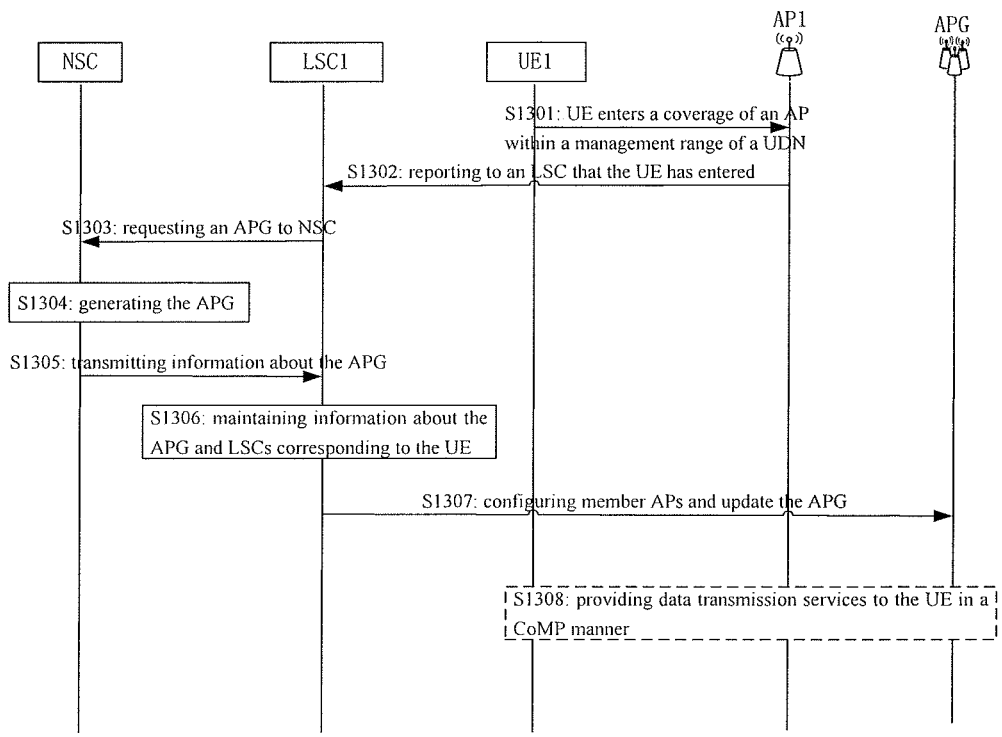
FIG. 13 is a schematic view showing an initialization procedure of APGs according to one embodiment of the present disclosure.

Referring to FIG. 13, when a UE (UE1) initially enters a coverage of an AP (AP1) of an UDN (S1301), i.e., the UE1 has been switched to the coverage of the AP1 within the management range of the UDN, the AP1 may acquire information about the UE1, determine a capability of the UE1 (e.g., a wireless access capability of the UE1), and exchange the information about the UE1 with a corresponding LSC1 (S1303).

When the LSC1 managing the AP1 at an access network side has acquired the information about the UE1 and found that an APG corresponding to the UE1 is not recorded locally, the LSC1 may transmit a request to an NSC to acquire an APG ID (S1303). The NSC may initially allocate the APG ID for the APG corresponding to the UE1 in accordance with the request (S1304), return to the LSC1 relevant information about the APG (S1305), and configure the LSC1 as a serving LSC of the UE1. The NSC may further record and maintain a correspondence among the UE1, the APG and the serving LSC (i.e., LSC1) locally.

Next, the LSC1 may record locally that the LSC1 is the serving LSC of the UE1, and establish and maintain the APG and LSCs corresponding to the UE1 (S1306). During the initialization, the APG corresponding to the UE1 merely includes the AP1 that has found the UE1, and the LSCs corresponding to the UE1 merely include the LSC1.

Next, the LSC1 may configure member APs in the APG, and transmit a refresh message of the APG so as to refresh the information about the APG of the UE maintained by each member AP. Each member AP may refresh and maintain the APG in accordance with the refresh message (S1307). Because the APG merely includes the AP1 during the initialization, the LSC may directly transmit to the AP1 the refresh message of the APG.

Then, each member AP in the APG may provide a data transmission service to the UE1 in a CoMP manner (S1308), which will not be particularly defined herein. The UE1 may be located within the coverage of at least one member AP in the APG.

Through the above-mentioned steps, the LSC and the AP may cooperate with each other, so as to automatically detect the AP capable of serving the UE. The APs in the APG may be refreshed at the LSC at the access network side, and the information may be configured for each AP. The LSC may determine the dynamic APG which includes the APs capable of serving the UE. The LSC may transmit to each member AP in the APG a wireless reconfiguration instruction with respect to the UE, so as to trigger the member AP in the APG to perform the data transmission in a CoMP manner. The APG ID for each UE is allocated by the NSC, so each UE may be served by a unique dynamic APG within the management range of the NSC of the UND. As a result, it is able to manage the data transmission for each UE on the basis of the APG, thereby to reduce the difficulty in the access management.

Scenario 2: APG Refresh

The UE may move within the coverage of the UDN, and the change in the services and network dynamic control may occur for the UE. When a conventional scheme is adopted, it is necessary to frequently perform the handover operations between the small cells, resulting in an oversized signaling overload of the core network. In the embodiments of the present disclosure, when the UE moves within the coverage of the APG, the services may be provided to the UE through the APG. In this way, it is able to enlarge the range within which the services are provided to the UE. In addition, it is able to provide various wireless access services to the UE through the APs with different RATs, thereby to reduce the signaling load of the core network.

In the DAPGing, at first it is necessary to select the member APs in the APG, and the data transmission service may be provided to the UE through a new member AP under the control of the LSC. Due to the movement of the UE and the change in the network condition, the member APs in the AGP may be refreshed in real time. In order to prevent the user experience from being adversely affected, it is necessary to refresh the member APs in the APG in a transparent manner to the UE through the coordination of the entities. Here, the member AP refresh, i.e., APG refresh, may be achieved at the management range of the NSC through the coordination of the LSCs or the adjustment of the NSC.

The APs may be switched for the UE through the dynamic APG refresh, and the data transmission may be performed through the selection of the AP by the network. In this way, it is able to provide the services to the UE in a UE-centered manner. As a result, it is able to reduce, as compared with the traditional handover procedure, the control signaling transmitted to the core network through a self-service capability within the management range of the NSC, thereby to reduce the signaling overhead of the core network.

The provision of services from different APs to the UE during the movement includes APG resource allocation and dynamic APG refresh. For the UE, it is merely necessary to maintain the connection to the APG. For the APG resource allocation, a control policy needs to be set by the UE voluntarily in accordance with the practical need, which will not be particularly defined herein. The reason for refresh the APG and the resultant refresh procedures will be described hereinafter.

Due to the movement of the UE and the change in the APs, the LSC at the access network side may refresh the APG corresponding to the UE. The reasons for refresh the APG will be mainly described as follows.

a) The APG is established with respect to one UE, and when the services to be provided to the UE and the actual AP serving the UE are changed, it is necessary to refresh the APG. For example, when it is unnecessary to provide the services to the UE through a large number of APs, the number of the APs serving the UE may be reduced, so as to save the resources.

b) Since a load of a certain AP is smaller than a predetermined threshold, a corresponding dormant mechanism needs to be provided so as to save the energy, i.e., a dormant policy may be provided for some of the APs. At this time, these APs may be in a dormant state, and the network needs to refresh the APs in the APG. Alternatively, when a load of a certain AP exceeds the predetermined threshold, it is necessary to reduce the number of the UEs served by the AP, i.e., delete the AP from the APGs.

c) When a network load increases, the UDN needs to activate the APs in the dormant state, or during D2D communication, some UEs may serve as the APs for providing the services to the other UEs. At this time, it is necessary to refresh the APG, and configure the corresponding message for the newly-added AP.

d) When the UE moves, the AP in the APG is incapable of providing the services to the UE due to signal attenuation, or the AP is capable of providing the services to the UE due to signal enhancement. At this time, it is necessary to refresh the APG, so as to refresh the AP capable of serving the UE to the APG, and configure the corresponding message for the AP.

The refresh procedure of the APG is transparent to the UE. Within the management range of an identical NSC, mainly the intra-LSC APG refresh and the inter-LSC APG refresh may be considered.

For example, the APG initially serving the UE is managed by the LSC1, the LSC1 is the serving LSC, and adjacent access network is managed by an LSC2, and the AP1 is capable of providing services to the UE1. When the AP1 has detected the UE, it may at first transmit information to an LSC to which it belongs. The LSC may determine whether or not it is able to perform the APG refresh. When the LSC is the serving LSC of the UE1, the UE1 may perform the APG refresh. Otherwise, the LSC may transmit an inquiry message to the NSC in a higher layer, and then the NSC and the LSC to which the UE1 belongs may cooperate to refresh the APG, so as to provide the services to the UE1.

1) Intra-LSC1 APG Refresh

It is assumed that the AP1 is within the management range of the LSC1, i.e., AP1 belongs to the LSC1. In addition, the LSC1 is the serving LSC of the AP1. The LSC1 may locally maintain the information about the serving LSC of the UE1, and establish a correspondence among the UE1, the APG and the LSCs. The LSCs corresponding to the UE1 may include the LSC1, and the APG corresponding to the UE1 may merely include the APs within the management range of the LSC1.

Figure 14:
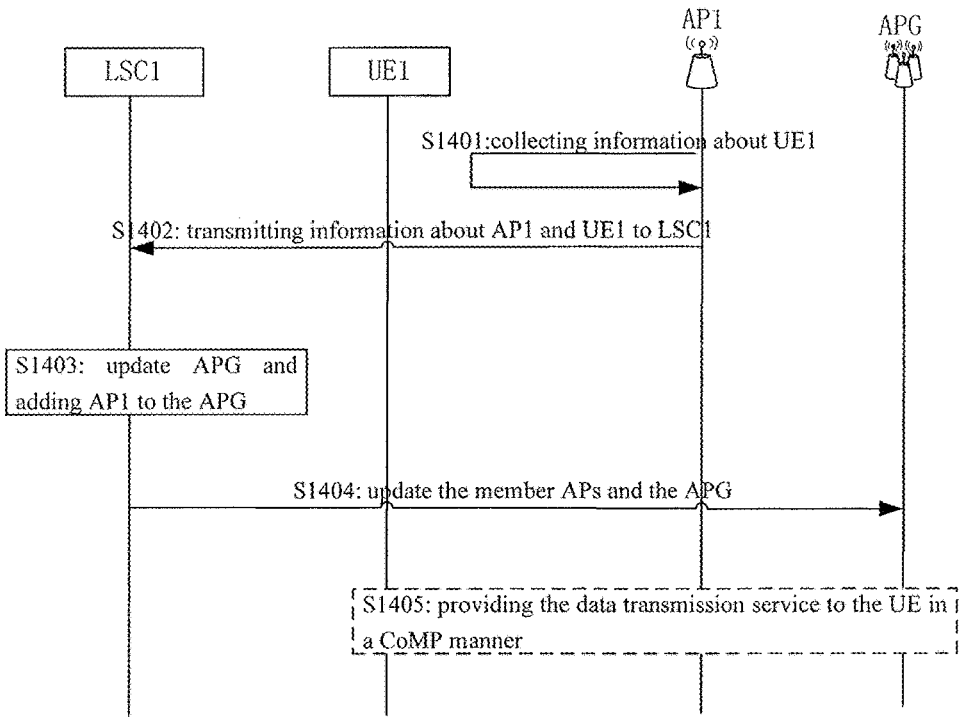
FIG. 14 is a schematic view showing a refresh procedure of the APGs within an LSC coverage according to one embodiment of the present disclosure.

With reference to the intra-LSC APG refresh (the addition of a member AP) as shown in FIG. 14, due to the movement of the UE1, the addition of the AP1 or the activation of the AP1, the AP1 may be used to provide services to the UE1. When the AP1 has detected the UE1, it may collect the relevant information about the UE1, e.g., the network access capability or the device ID (S1401). If the AP1 itself is capable of serving the UE1, it may report to the LSC1 to which the AP1 belongs the relevant information about the newly-detected UE1 (S1402).

Next, the LSC1 may refresh the APG corresponding to the UE1 maintained locally in accordance with the information from the AP1, and add the AP1 to the APG, when the LSC1 is the serving LSC of the UE1 (S1403). Next, the LSC1 may transmit the refresh message of the APG to each member AP in the refreshed APG, so as to refresh the member APs (S1404). Here, the member APs in the APG all belong to the LSC1, so the LSC1 may direct transmit the refresh message of the APG to each member AP.

Then, the member APs in the refreshed APG may be used to provide the data transmission services to the UE1 in a CoMP manner (S1405).

Figure 15:
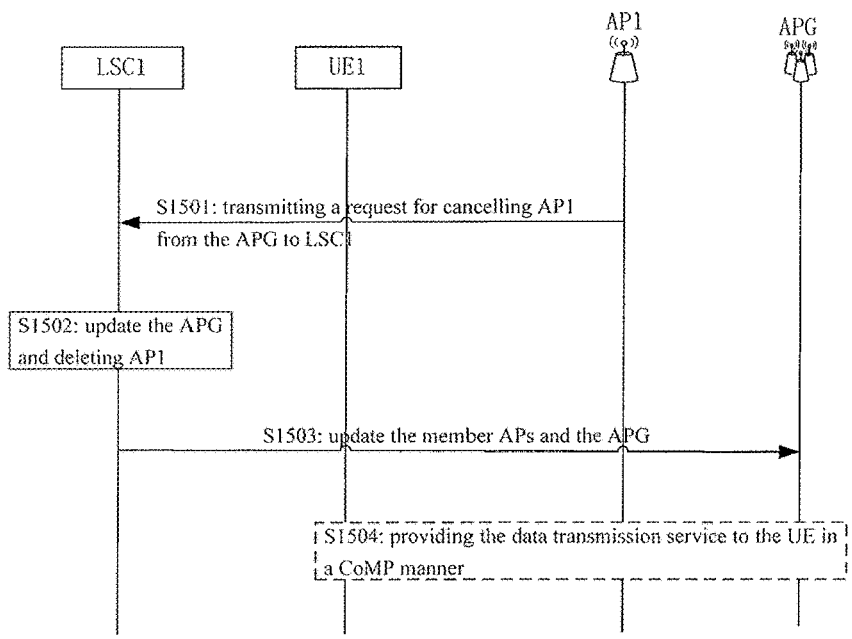
FIG. 15 is another schematic view showing the refresh procedure of the APGs within the LSC coverage according to one embodiment of the present disclosure.

With reference to the intra-LSC APG refresh (the deletion of a member AP) as shown in FIG. 15, when the AP1 is incapable of detecting the UE1 due to the movement of the UE or the AP1 is in the dormant state and thus incapable of providing services to the UE1, the AP1 may transmit a request message for requesting the deletion of the AP1 from the APG to the LSC1 (S1501). Upon the receipt of the request message, the LSC1 may delete the AP1 from the APG (S1502).

Next, the LSC1 may transmit the refresh message of the APG to each member AP in the refreshed APG, so as to delete the AP1 from the APG (S1503). Here, the member APs in the APG all belong to the LSC1, so the LSC1 may directly transmit the refresh message of the APG to each member AP.

Then, the member APs in the refreshed APG may be used to provide the data transmission services to the UE1 in a CoMP manner (S1504).

2) Inter-LSC APG Refresh

When the AP1 belongs to the LSC2 different from the LSC1 to which the member APs in a current APG corresponding to the UE1 belongs, it is necessary to provide the data transmission services to the UE1 through the coordination between the two adjacent LSCs. Because more than one LSCs are involved, it is necessary to select one of the LSCs as the serving LSC, so as to maintain the APG and the LSCs corresponding to the UE. Here, when the LSC1 is the serving LSC, the LSC2 needs to cooperatively manage the AP1, so as to provide the services to the UE. When the LSC2 is the serving LSC, the information about the APG needs to be synchronized between the LSC1 and the LSC2, and the LSC1 needs to cooperatively manage the relevant AP in the original APG, so as to provide the services to the UE.

Figure 16:
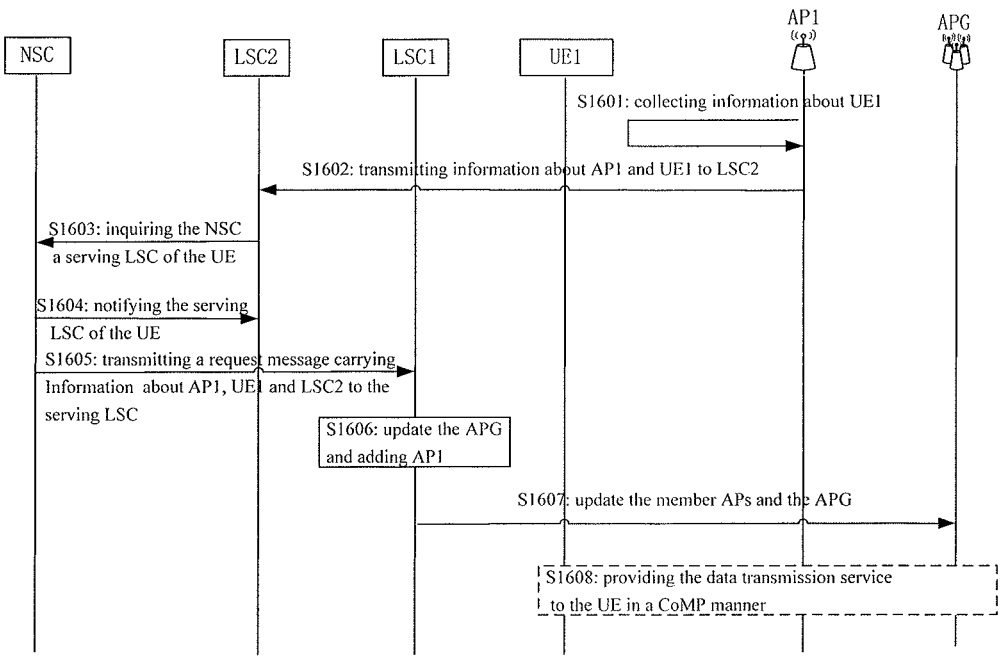
FIG. 16 is a schematic view showing the refresh procedure of the APGs between the LSCs according to one embodiment of the present disclosure.

With reference to the inter-LSC APG refresh (the addition of a member AP) as shown in FIG. 16, due to the movement of the UE or the activation of the AP1, the UE1 may be detected by the AP1. When the AP1 has detected the UE1, it may collect the relevant information about the UE1, e.g., the network access capability or the device ID (S1601). When the AP1 itself is capable of serving the UE1, it may report to the LSC2 to which the AP1 belongs the relevant information about the newly-detected UE1 (S1602).

Next, the LSC2 may inquire the information about the serving LSC corresponding to the UE from the NSC in accordance with the information from the AP1 when the information about the serving LSC of the UE1 is not maintained in the LSC2 locally (S1603). The NSC may inquire the information about the serving LSC (e.g., the LSC1) corresponding to the UE1, and transmit a notification message to the LSC2, so as to notify the LSC2 to record that the serving LSC of the UE1 is the LSC1 (S1604). In addition, the NSC may further transmit to the LSC1 a request message carrying the information about the UE1, the AP1 and the LSC2 (S1605).

Next, upon the receipt of the request message from the NSC, the LSC1 may refresh the APG corresponding to the UE1, and add the AP1 to the APG (S1606). In addition, the LSC1 may transmit a refresh message of the APG to each member AP in the refreshed APG, so as to refresh the member AP (S1607). For each member AP belonging to the LSC1, the LSC1 may directly transmit the refresh message of the APG to the member AP. For the each member AP belonging to the other LSCs, the LSC1 may transmit the refresh message of the APG to the member AP via the LSC to which the member AP belongs, i.e., the LSC1 may transmit the refresh message of the APG to the LSC to which the member AP belongs, and then the LSC to which the member AP belongs may forward the refresh message to the member AP.

Then, the member APs in the APG may provide the data transmission services to the UE1 in a CoMP manner (S1608).

Figure 17:
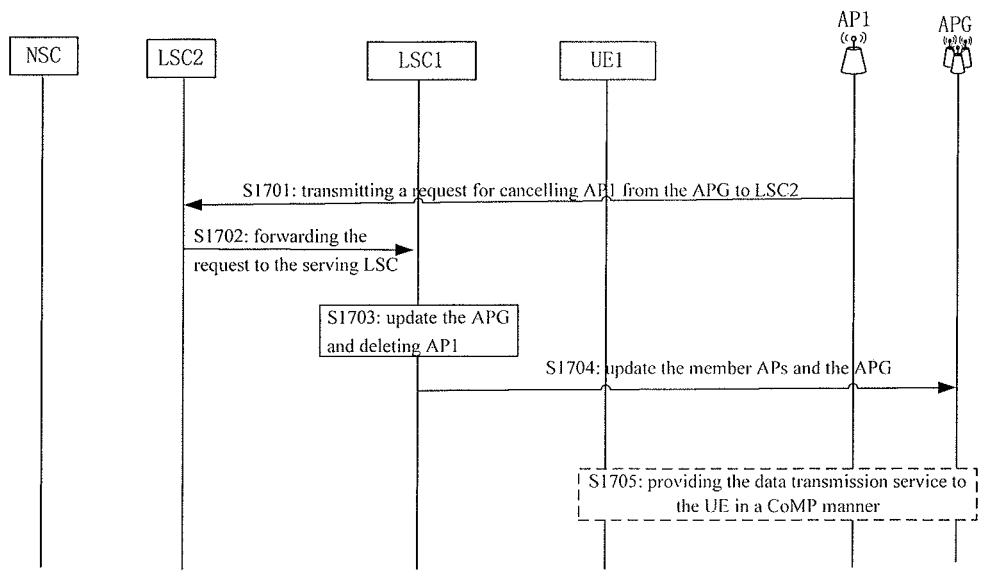
FIG. 17 is another schematic view showing the refresh procedure of the APGs between the LSCs according to one embodiment of the present disclosure.

With reference to the inter-LSC APG refresh (the deletion of a member AP) as shown in FIG. 17, when the AP1 is incapable of detecting the UE1 due to the movement of the UE1 or the AP1 is in the dormant state and thus incapable of providing services to the UE1, the AP1 may transmit a request message for requesting the deletion of the AP1 from the APG to the LSC2 to which the AP1 belongs (S1701).

Upon the receipt of the request message, the LSC2 may determine that the serving LSC of the UE1 is the LSC1 in accordance with the information about the serving LSC corresponding to the UE1 recorded locally, and forward the request message to the LSC1 (S1702).

Upon the receipt of the request message from the LSC2, the LSC1 may delete the AP1 from the APG corresponding to the UE1 (S1703). Here, after the deletion of the AP1, the LSC1 may further determine whether or not the APG includes the AP belonging to the LSC2. When the APG does not include any AP belonging to the LSC2, the LSC1 may delete the LSC2 from the LSCs corresponding to the UE1.

Next, the LSC1 may transmit the refresh message of the APG to each member AP in the refreshed APG, so as to delete the AP1 from the APG (S1703). For each member AP belonging to the LSC1, the LSC1 may directly transmit the refresh message of the APG to the member AP. For each member AP belonging to the other LSCs, the LSC1 may transmit the refresh message of the APG to the member AP via the LSC to which the member AP belongs, i.e., the LSC1 may transmit the refresh message to the LSC to which the member AP belongs, and then the LSC to which the member AP belongs may forward the refresh message to the member AP.

Then, the member APs in the refreshed APG may provide the data transmission services to the UE1 in a CoMP manner (S1705).

In a possible embodiment of the present disclosure, upon the receipt of the request message, when the LSC2 is not the serving LSC of the UE1, the LSC2 may not directly transmit the request message to the serving LSC (e.g., the LSC1). Instead, it may transmit the request message to the NSC, and then the NSC may forward the request message to the serving LSC (e.g., the LSC1).

Scenario 3: Inter-NSC APG Handover or Handover Between APG and Traditional Cellular Network (APG Cancellation)

When the UE has moved from a management range of one NSC to a management range of another NSC, it is necessary to perform the inter-NSC handover procedure, i.e., the APG handover. When the UE has moved from the UDN to the cellular network (e.g., a macro cellular network or a micro cellular network), it is also necessary to perform the handover. When the number of the APs in the AGP is 0, it is necessary for the original UDN to perform the APG cancellation. To be specific, the NSC may recover the APG allocated for the UE, the information about the serving LSC of the UE recorded in each LSC corresponding to the UE may be deleted from the LSC, and the serving LSC may delete the APG and the LSCs corresponding to the UE. The above handover procedure includes a hard handover procedure and a soft handover procedure.

1) Hard handover procedure: when the number of the APs in the APG is 0, the UE may detect a new network. When the UE has moved from one UDN to another UDN, the APG initialization may be performed. When the UE has moved from one UDN to a macro cellular network or any other network, the UE may establish a connection to a traditional network and then perform the data transmission. Before the UE has been switched to a new network, the communication may be interrupted.

2) Soft handover procedure: when the single AP in the APG is incapable of serving the UE, it is necessary to wait for the establishment of a new connection between the UE and a new network (e.g., a new UDN or cellular network) before the interruption of the connection between the single AP and the UE. After the new connection has been established, the APG may be cancelled in the original UDN. Through this handover mode, it is able to prevent the occurrence the communication interruption as possible during the handover.

Figure 18:
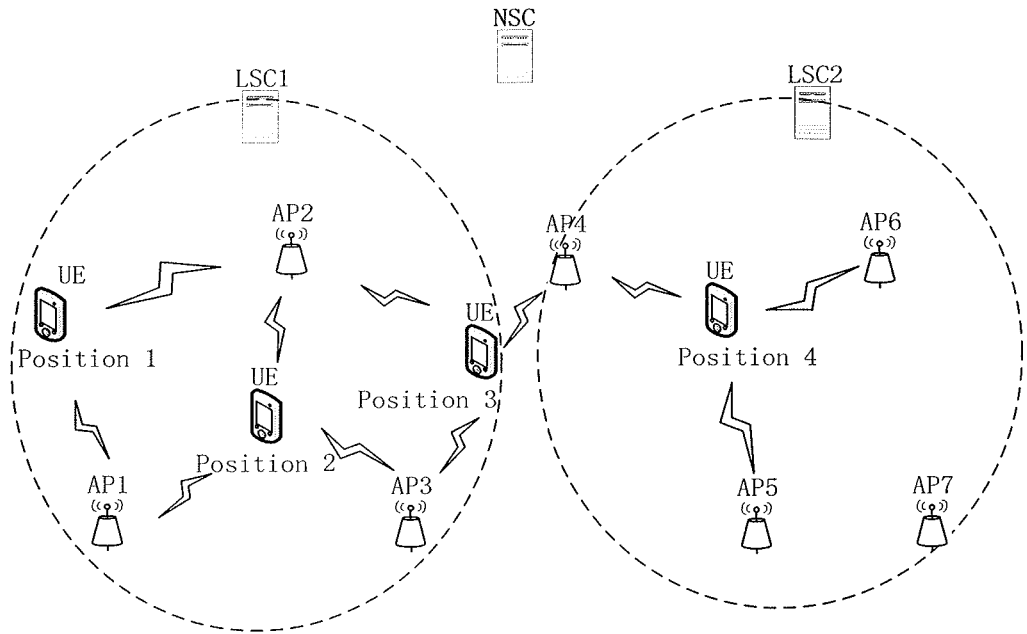
FIG. 18 is a schematic view showing an application scenario of the dynamic AP grouping method according to one embodiment of the present disclosure.

A network access procedure will be described hereinafter. Referring to FIG. 18 which shows a part of an UDN, the LSC1 and the LSC2 are located within the management range of the NSC, AP1 to AP3 belong to the LSC1, AP4 to AP7 belong to the LSC2, and all the APs are capable of serving the UE1. During the movement, the UE1 may move to position 1, position 2, then to position 3, and then to position 4.

When the UE1 has moved to position 1, the AP1 or AP2 is capable of finding the UE1. Through the APG initialization, the NSC may allocate the APG for the UE1, and the serving LSC of the UE1 is the LSC1. At this time, through the addition of a new member AP, the APG may include the AP1 and AP2. Then, the AP1 and the AP2 may provide the data transmission services to the UE1 in a CoMP manner.

When the UE1 has moved to position 2, the AP3 is capable of finding the UE1. At this time, through the addition of a new AP, the APG may include the AP1, AP2 and AP3. Then, the AP1 to AP3 may provide the data transmission services to the UE1 in a CoMP manner.

When the UE1 has moved to position 3, the AP4 is capable of finding the UE1, and the UE1 has moved out of the coverage of the AP1. At this time, through the addition and deletion of the member APs, the APG may include the AP2, AP3 and AP4. Then, the AP2 to AP4 may provide the data transmission services to the UE1 in a CoMP manner.

When the UE has moved to position 4, the AP5 and AP6 are capable of finding the UE1, and the UE1 has moved out of the coverage of the AP2 and AP3. At this time, through the addition and deletion of the member APs, the APG may include the AP4, AP5 and AP6. Then, the AP2 to AP4 may provide the data transmission services to the UE1 in a CoMP manner. During this procedure, the number of the APs in the APG belonging to the LSC1 is 0, so the change of the serving LSC may be triggered, i.e., the serving LSC of the UE1 may be changed to LSC2.

In the above-mentioned embodiments, one APG may include the APs belonging to different LSCs. For simplification, one APG may merely include the APs belonging to one LSC. Further description will be given hereinafter in conjunction with the drawings.

Figure 19:
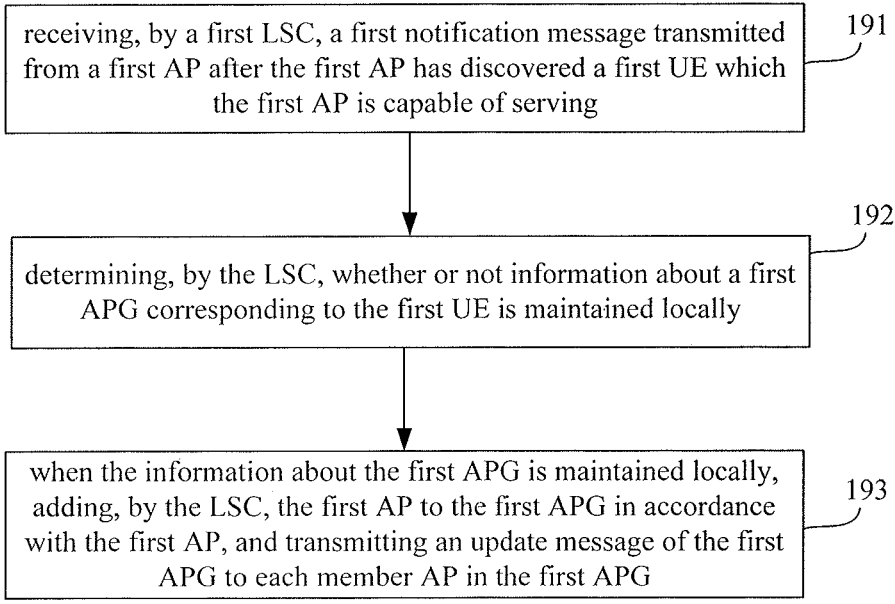
FIG. 19 is a flow chart of a dynamic AP grouping method according to one embodiment of the present disclosure.

As shown in FIG. 19, the present disclosure provides in some embodiments a dynamic AP grouping method for an LSC in a UDN, which may include the following steps.

Step 191: receiving, by a first LSC at an access network side, a first notification message transmitted from a first AP, after the first AP has found a first UE which the first AP is capable of serving, the first AP being an AP belonging to the first LSC.

Here, after finding the first UE within its coverage, the first AP may determine that it may serve the first UE in accordance with its service capability (e.g., network access capability or its own load state) and a capability of the first UE (e.g., a network access capability of the first UE), and then transmit the first notification message to the first LSC to which the first AP belongs. The first notification message may carry information about the first AP and the first UE, e.g., IDs of the devices.

Step 192: determining, by the LSC, whether or not information about a first APG corresponding to the first UE is maintained locally, the first APG including member APs belonging to the LSC and currently capable of serving the first UE.

Here, the APG is allocated by an NSC to which the LSC belongs, and it uniquely corresponds to the UE. In the embodiments of the present disclosure, one APG merely includes the APs belonging to an identical LSC. After the NSC has configured the APG for a certain UE, the corresponding LSC may maintain locally the information about the APG corresponding to the UE. Hence, in Step 192, if the information about the first APG is maintained locally in the LSC, it means the NSC has already allocated the APG for the first UE. If the information about the first APG is not maintained locally in the LSC, it means the NSC has not yet allocated the APG for the first UE.

Step 193: when the information about the first APG is maintained locally, adding, by the LSC, the first AP to the first APG in accordance with the first AP, and transmitting a refresh message of the first APG to each member AP in the first APG, the refresh message carrying information about the member APs in the first APG.

Here, because the information about the first APG has been maintained locally in the LSC, it means the NSC has already allocated the APG for the first UE. At this time, it is necessary to add the newly-found first AP of the first UE to the first APG corresponding to the first UE, so as to refresh the member APs in the first APG. In addition, it is necessary to transmit a refresh message to each member AP in the first APG, so as to refresh the information about the member APs in the first APG. In this way, the data transmission services may be provided to the first UE through one or more refresh member APs in the first APG in a CoMP mode. Through the above-mentioned steps, it is able to dynamically refresh the APG for providing the services to the UE in a UE-centered manner, thereby to prevent the UE from frequently acquiring a network environment and reduce the signaling load of a core network.

When, in Step 192, the LSC has determined that the information about the first APG is not locally maintained, the dynamic AP grouping method may further include the following steps.

Step 194: transmitting, by the LSC, a first request message for requesting an NSC at a core network side to allocate APGs for the first UE to the NSC, and receiving a first configuration message from the NSC with respect to the first request message, the first configuration message carrying the first APG re-allocated by the NSC and uniquely corresponding to the first UE.

Here, when the information about the first APG is not maintained locally in the LSC, it means the NSC has not allocated the APG for the first UE yet. At this time, the LSC may request the NSC to allocate the APG for the first UE. The NSC may uniquely identify each APG using an APG ID. The first configuration message may carry such information as the APG ID of the first APG.

Step 195: recording and maintaining the information about the first APG in accordance with the first configuration message, and transmitting the refresh message of the first APG to each member AP in the first APG, the first APG including the first AP.

Here, upon the receipt of the information about the first APG allocated by the NSC for the first UE, the LSC may record and maintain the information locally, and maintain the member APs in the first APG. During the initialization of the first APG, the first APG may include the first AP. Then, the LSC may transmit the refresh message of the first APG to each member AP in the first APG (during the initialization, the first APG merely includes the first AP), so as to refresh the member APs in the first APG. The refresh message may carry the information about the member APs in the first APG corresponding to the first UE.

In the embodiments of the present disclosure, when a certain AP in the first APG, e.g., the first AP, is incapable of serving the first UE, it is necessary for the LSC to delete the AP from the first APG, and notify each member AP in the first APG to refresh the information about the member APs in the first APG. At this time, the dynamic AP grouping method may further include Step 196 of deleting, by the LSC, the first AP from the first APG, and transmitting the refresh message of the first APG to each member AP in the first APG.

Here, the LSC may determine whether or not the first AP is capable of serving the first UE in various modes. For example, when the first AP is incapable of serving the first UE because the first AP has an oversized load or the first AP needs to enter a dormant state, the first AP may transmit to the LSC a second request message for requesting the deletion of the first AP from the first APG. In this way, upon the receipt of the second request message, the LSC may determine that the first AP is incapable of serving the first UE. For another example, the LSC may periodically detect a state of the first AP, e.g., through a heartbeat message. If the first AP is failed (e.g., if the heartbeat message of the first AP cannot be received), it may determine that the first AP is incapable of serving the first UE.

In the embodiments of the present disclosure, upon the deletion of the first AP from the first APG, the LSC may further determine whether or not the number of the member APs in the first APG is 0. When the number of the member APs in the first APG is 0, the LSC may delete the information about the first APG maintained locally, and transmit to the NSC a cancellation message for cancelling the first APG, so as to notify the NSC to cancel the first APG allocated for the first UE and recover such resources as the APG ID.

Figure 20:
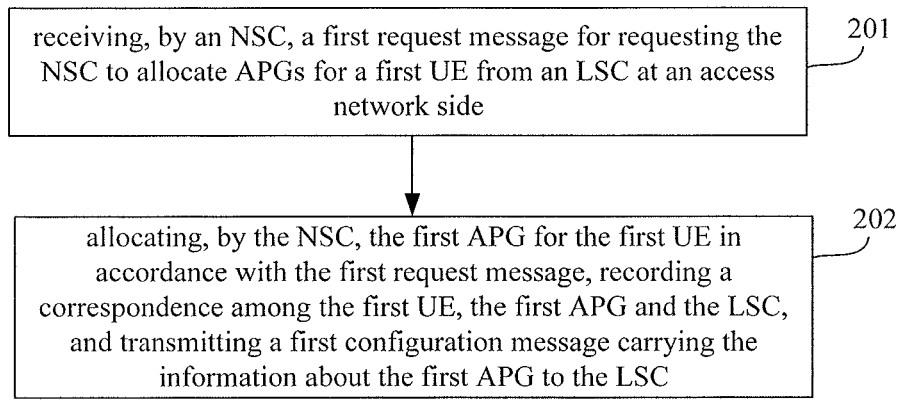
FIG. 20 is another flow chart of a dynamic AP grouping method according to one embodiment of the present disclosure.

The dynamic AP grouping method at the LSC side has been described hereinbefore. The present disclosure further provides in some embodiments a dynamic AP grouping method at an NSC side which, as shown in FIG. 20, includes the following steps.

Step 201: receiving, by an NSC at a core network side, a first request message for requesting the NSC to allocate APGs for a first UE from an LSC at an access network side, the first request message being transmitted from the LSC when the LSC has received a first notification message from a first AP after the LSC has found that the first AP is capable of serving the first UE and when information about a first APG corresponding to the first UE is not maintained by the LSC locally.

Here, upon the finding of the first UE capable of being served by the first AP, the first AP may transmit the first notification message to the LSC to which it belongs. When the LSC has received the first notification message and determined that the information about the first APG corresponding to the first UE is not maintained locally, it means the NSC has not allocated the APG for the first UE yet. At this time, the LSC may transmit the first request message to the NSC to which it belongs, so as to request the NSC to allocate the corresponding APG for the first UE.

Step 202: allocating, by the NSC, the first APG for the first UE in accordance with the first request message, recording a correspondence among the first UE, the first APG and the LSC, and transmitting a first configuration message carrying the information about the first APG to the LSC.

Here, the NSC may allocate the unique first APG for the first UE in accordance with the first request message, and different APGs may be identified by the APG IDs. The NSC may further record locally the correspondence among the first UE, the first APG and the LSC. After the allocation of the first APG, the NSC may transmit the first configuration message to the LSC, so that the LSC may configure and maintain the relevant information about the first APG corresponding to the first UE in accordance with the first configuration message.

In the embodiments of the present disclosure, after the member APs in the first APG have been deleted, the NSC may further receive from the LSC a cancellation message for cancelling the first APG when the number of the member APs in the first APG is 0. At this time, the NSC may cancel the first APG allocated for the first UE in accordance with the cancellation message, and delete the correspondence among the first UE, the first APG and the LSC recorded locally.

Figure 21:
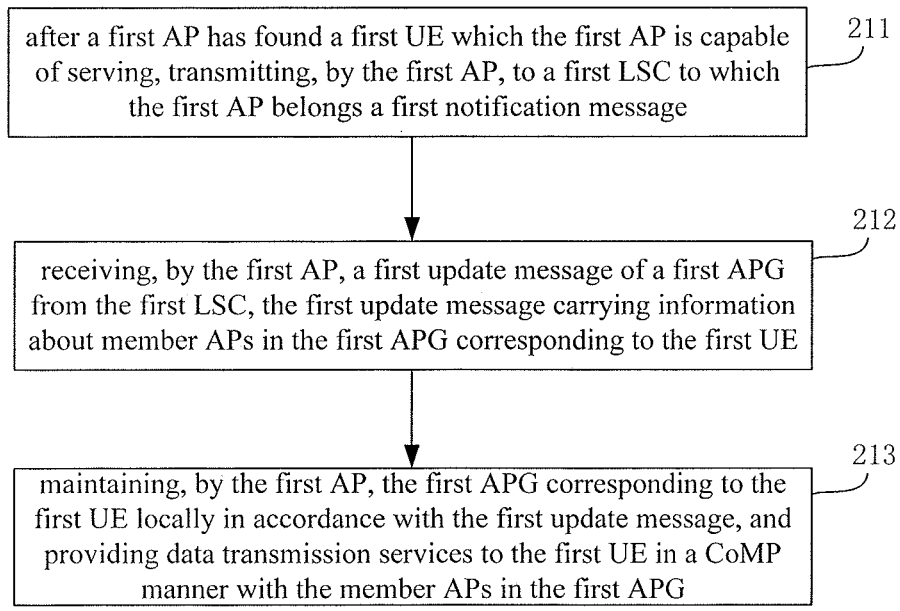
FIG. 21 is yet another flow chart of a dynamic AP grouping method according to one embodiment of the present disclosure.

The present disclosure further provides in some embodiments a dynamic AP grouping method for use in an AP in a UDN which, as shown in FIG. 21, includes: Step 211 of, after a first AP has found a first UE which the first AP is capable of serving, transmitting, by the first AP, to a first LSC to which the first AP belongs a first notification message for notifying the first UE is found; Step 212 of receiving, by the first AP, a first refresh message of a first APG from the first LSC, the first refresh message carrying information about member APs in the first APG corresponding to the first UE, the first APG including the member APs currently capable of serving the first UE; and Step 213 of maintaining, by the first AP, the first APG corresponding to the first UE locally in accordance with the first refresh message, and providing data transmission services to the first UE in a CoMP manner with the member APs in the first APG.

Subsequent to Step 213, the first AP may further dynamically refresh the APG. At this time, the dynamic AP grouping method may further include: receiving, by the first AP, a second refresh message of the first APG from the first LSC, the second refresh message carrying the refreshed first APG; and refresh, by the first AP, the first APG maintained locally in accordance with the second refresh message.

The first AP may not continue to serve the first UE because, for example, the first AP has a high working load, a dormant period of the first AP is expired, the first UE has moved out of the coverage of the first AP, or the signal quality fails to meet a predetermined requirement due to a too large distance between the first AP and the first UE. At this time, the dynamic AP grouping method further includes transmitting, by the first AP, to the first LSC a request message for requesting the deletion of the first AP from the first APG, and deleting the first APG maintained locally. Through the request message, the serving LSC of the first UE may be triggered to delete the first AP from the first APG, so as to refresh the first APG.

Through the above-mentioned steps, the first AP may maintain locally the information about the member APs in the first APG. As a result, it is able to achieve the AP grouping in a UE-centered manner and dynamically refresh the APG for providing the services to the UE, thereby to prevent the UE from frequently acquiring the network environment and reduce the signaling load of the core network.

The dynamic AP grouping methods at the LSC side, the NSC side and the AP side have been described hereinabove. The LSC, NSC and AP for implementing the above-mentioned methods will be described hereinafter.

Figure 22:
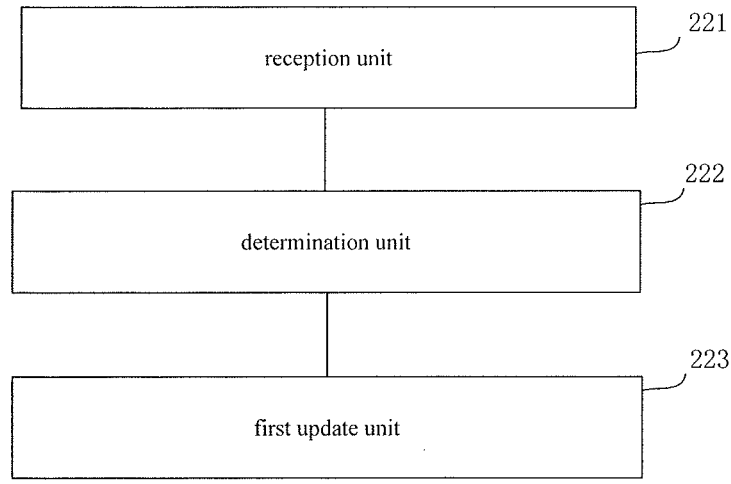
FIG. 22 is a schematic view showing an LSC according to one embodiment of the present disclosure.

The present disclosure provides in some embodiments an LSC. For convenience, the LSC is arranged at an access network side of a UDN and capable of communicating with an NSC at a core network side of the UDN. As shown in FIG. 22, the LSC includes: a reception unit 221 configured to receive a first notification message transmitted from a first AP after the first AP has found a first UE which the first AP is capable of serving, the first AP being an AP belonging to the first LSC; a determination unit 222 configured to determine whether or not information about a first APG corresponding to the first UE is maintained locally, the first APG including member APs belonging to the LSC and currently capable of serving the first UE; and a first refresh unit 223 configured to, when the information about the first APG is maintained locally, add the first AP to the first APG in accordance with the first AP, and transmit a refresh message of the first APG to each member AP in the first APG, the refresh message carrying information about the member APs in the first APG.

In the embodiments of the present disclosure, the LSC may further request the NSC to allocate the APG for the UE. At this time, the LSC may further include: a request unit configured to, when the information about the first APG is not maintained locally, transmit a first request message for requesting an NSC at a core network side to allocate APGs for the first UE to the NSC, and receive a first configuration message from the NSC with respect to the first request message, the first configuration message carrying the first APG re-allocated by the NSC and uniquely corresponding to the first UE; and a second refresh unit configured to record and maintain the information about the first APG in accordance with the first configuration message, and transmit the refresh message of the first APG to each member AP in the first APG, the first APG including the first AP.

In the embodiments of the present disclosure, the LSC may further delete the member AP from the APG. At this time, the LSC may further include a third refresh unit configured to, when the first AP is incapable of serving the first UE, delete the first AP from the first APG, and transmit the refresh message of the first APG to each member AP in the first APG. Determining the first AP is incapable of serving the first UE includes that the LSC has received from the first AP a second request message which is transmitted when the first AP is to stop serving the first UE and which is used to request the deletion of the first AP from the first APG, or the LSC has detected that the first AP is in a predetermined abnormal state.

When all the member APs in the first APG have been deleted, the LSC further needs to report to the NSC, so as to cancel the first APG. At this time, the LSC may further include a cancellation request unit configured to, after the first AP has been deleted from the first APG by the third refresh unit, determine whether or not the number of the member APs in the first APG is 0, and when the number of the member APs in the first APG is 0, delete the information about the first APG maintained locally and transmit to the NSC a cancellation message for cancelling the first APG.

Figure 23:
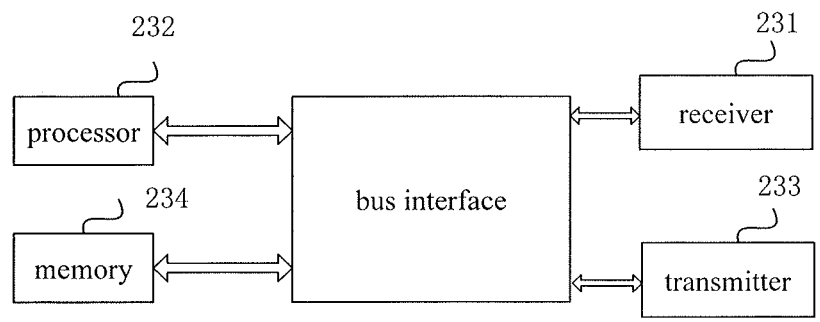
FIG. 23 is another schematic view showing an LSC according to one embodiment of the present disclosure.

As shown in FIG. 23, the present disclosure further provides in some embodiments an LSC which includes: a receiver 231 configured to receive a first notification message transmitted from a first AP after the first AP has found a first UE which the first AP is capable of serving, the first AP being an AP belonging to the first LSC; a processor 232 configured to determine whether or not information about a first APG corresponding to the first UE is maintained locally, the first APG including member APs belonging to the LSC and currently capable of serving the first UE, and when the information about the first APG is maintained locally, add the first AP to the first APG in accordance with the first AP; and a transmitter 233 configured to transmit a refresh message of the first APG to each member AP in the first APG, the refresh message carrying information about the member APs in the first APG.

The LSC may further include a memory 234 configured to store therein downlink data or any other paging-related data.

The processor 232 and the memory 234 may be connected to the receiver 231 via a bus interface. Bus architecture may include a number of buses and bridges connected to each other, so as to connect various circuits for one or more processors 232 and one or more memories 234. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the receiver 231 or transmitter 233 may include more than one element for communication with any other devices over a transmission medium. The processor 232 may take charge of managing the bus architecture and general processings. The memory 234 may store therein data for the operation of the processor.

Figure 24:
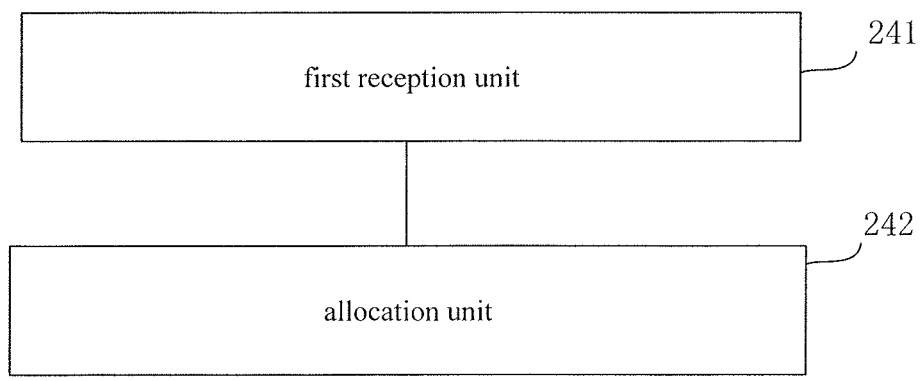
FIG. 24 is a schematic view showing an NSC according to one embodiment of the present disclosure.

As shown in FIG. 24, the present disclosure further provides in some embodiments an NSC at a core network side, which includes: a first reception unit 241 configured to receive a first request message for requesting the NSC to allocate APGs for a first UE from an LSC at an access network side, the first request message being transmitted from the LSC when the LSC has received a first notification message from a first AP after the LSC has found that the first AP is capable of serving the first UE and when information about a first APG corresponding to the first UE is not maintained by the LSC locally; and an allocation unit 242 configured to allocate the first APG for the first UE in accordance with the first request message, record a correspondence among the first UE, the first APG and the LSC, and transmit a first configuration message carrying the information about the first APG to the LSC.

In a possible embodiment of the present disclosure, the NSC may further include: a second reception unit configured to receive a cancellation message for cancelling the first APG from the LSC when the number of member APs in the first APG is 0; and a cancellation processing unit configured to cancel the first APG allocated for the first UE in accordance with the cancellation message, and delete the correspondence among the first UE, the first APG and the LSC recorded locally.

Figure 25:
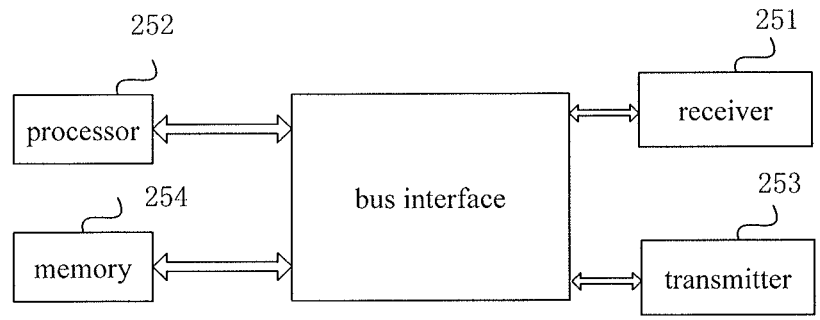
FIG. 25 is another schematic view showing an NSC according to one embodiment of the present disclosure.

As shown in FIG. 25, the present disclosure further provides in some embodiments an NSC, which includes: a receiver 251 configured to receive a first request message for requesting the NSC to allocate APGs for a first UE from an LSC at an access network side, the first request message being transmitted from the LSC when the LSC has received a first notification message from a first AP after the LSC has found that the first AP is capable of serving the first UE and when information about a first APG corresponding to the first UE is not maintained by the LSC locally; a processor 252 configured to allocate the first APG for the first UE in accordance with the first request message, record a correspondence among the first UE, the first APG and the LSC; and a transmitter 253 configured to transmit a first configuration message carrying the information about the first APG to the LSC.

The NSC may further include a memory 254 configured to store therein downlink data or any other paging-related data.

The processor 252 and the memory 254 may be connected to the receiver 251 via a bus interface. Bus architecture may include a number of buses and bridges connected to each other, so as to connect various circuits for one or more processors 252 and one or more memories 254. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the receiver 251 may include more than one elements for communication with any other devices over a transmission medium. The processor 252 may take charge of managing the bus architecture and general processings. The memory 254 may store therein data for the operation of the processor.

Figure 26:
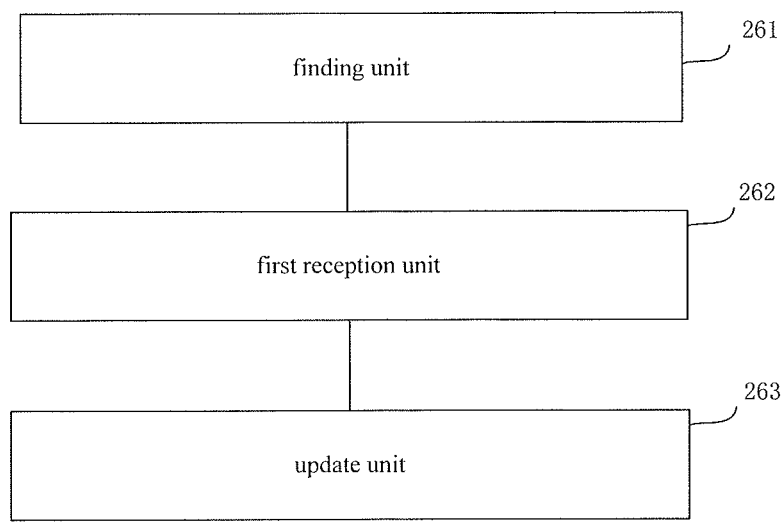
FIG. 26 is a schematic view showing a first AP according to one embodiment of the present disclosure.

As shown in FIG. 26, the present disclosure further provides in some embodiments an AP (for convenience, a first AP), which includes: a finding unit 261 configured to, after the finding of a first UE which the first AP is capable of serving, transmit a first notification message to a first LSC to which the first AP belongs; a first reception unit 262 configured to receive a first refresh message of a first APG from the first LSC, the first refresh message carrying information about member APs in the first APG corresponding to the first UE, the first APG including the member APs currently capable of serving the first UE; and a refresh unit 263 configured to maintain the first APG corresponding to the first UE locally in accordance with the first refresh message, and provide data transmission services to the first UE in a CoMP manner with the member APs in the first APG.

Here, the first AP may further include a second reception unit configured to receive a second refresh message of the first APG from the first LSC, the second refresh message carrying the refreshed first APG. The refresh unit may be further configured to refresh the first APG maintained locally in accordance with the second refresh message.

Here, the finding unit may be further configured to, when the first AP is to stop serving the first UE, transmit to the first LSC a request message for requesting the deletion of the first AP from the first APG, and delete the first APG maintained locally.

Figure 27:
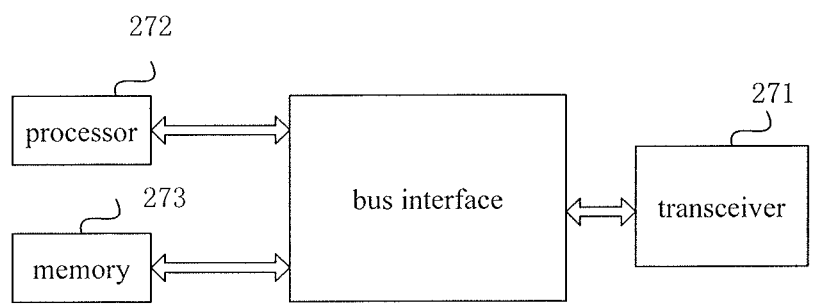
FIG. 27 is another schematic view showing a first AP according to one embodiment of the present disclosure.

As shown in FIG. 27, the present disclosure further provides in some embodiments an AP (i.e., a first AP), which includes: a transceiver 271 configured to, after the finding of a first UE which the first AP is capable of serving, transmit a first notification message to a first LSC to which the first AP belongs, and receive a first refresh message of a first APG from the first LSC, the first refresh message carrying information about member APs in the first APG corresponding to the first UE, the first APG including the member APs currently capable of serving the first UE; and a processor 272 configured to maintain the first APG corresponding to the first UE locally in accordance with the first refresh message, and provide data transmission services to the first UE in a CoMP manner with the member APs in the first APG.

The first AP may further include a memory 273 configured to store therein downlink data or any other paging-related data.

The processor 272 and the memory 73 may be connected to the transceiver 271 via a bus interface. Bus architecture may include a number of buses and bridges connected to each other, so as to connect various circuits for one or more processors 272 and one or more memories 273. In addition, as is known in the art, the bus architecture may be used to connect any other circuits, such as a circuit for a peripheral device, a circuit for a voltage stabilizer and a power management circuit, which will not be particularly defined herein. Various bus interfaces may be provided, and the transceiver 271 may include more than one elements for communication with any other devices over a transmission medium. The processor 272 may take charge of managing the bus architecture and general processings. The memory 273 may store therein data for the operation of the processor.

According to the embodiments of the present disclosure, it is able to provide services to the UE in a UE-centered manner as compared with the traditional mode where the services are provided to the UE in a network-centered manner, thereby to prevent the UE from frequently acquiring the network environment, and provide the data transmission service to the UE at a low speed or in a stationary state through the APGs. In addition, during the movement of the UE, it is able to transmit the services to the UE through dynamic refresh of the APs in the APGs and coordination of the APs in the APG. In a word, in the embodiments of the present disclosure, it is able to reduce the number of handover operations made by the UE, and perform the handover operation in the APG not through a core network, thereby to reduce the signaling load of the core network. In addition, in the embodiments of the present disclosure, it is also able to dynamically acquire the network environment, thereby to adjust in real time the AP by which the UE is served.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A dynamic Access Point (AP) grouping method, comprising:

receiving, by a first Local Service Center (LSC) at an access network side, a first notification message transmitted from a first AP after the first AP has found a first User Equipment (UE), the first AP being an AP belonging to the first LSC, wherein service capability of the first AP meets a requirement for providing network access service for the first UE;

when information about a serving LSC of the first UE is recorded by the first LSC, determining, by the first LSC, whether or not the first LSC is the serving LSC of the first UE in accordance with the information, information about a first Access Point Group (APG) corresponding to the first UE and LSCs corresponding to the first UE being maintained on the serving LSC of the first UE, the first APG comprising member APs, the LSCs corresponding to the first UE comprising LSCs to which respective member APs belong, wherein service capability of each of the member APs currently meets the requirement for providing network access service for the first UE; and when the first LSC has determined that it is the serving LSC of the first UE, adding, by the first LSC, the first AP to the first APG corresponding to the first UE, and transmitting, by the first LSC, a refresh message of the first APG to each member AP in the first APG, the refresh message carrying information about the member APs in the first APG;

wherein when the first notification message has been received and the first LSC determines that the first LSC is not a serving LSC of the first UE in accordance with the information about the serving LSC of the first UE, the dynamic AP grouping method further comprises:

transmitting to the serving LSC of the first UE a first request message for requesting addition of the first AP to the first APG;

receiving a refresh message of the first APG transmitted by the serving LSC after the first AP has been added to the first APG and the LSCs corresponding to the first UE have been refreshed in accordance with the first LSC; and forwarding the refresh message of the first APG to each member AP belonging to the first LSC.

2. The dynamic AP grouping method according to claim 1, wherein when the first notification message has been received and the information about the serving LSC of the first UE is not recorded by the first LSC, the dynamic AP grouping method further comprises:

transmitting, by the first LSC, an inquiry message for inquiring the serving LSC of the first UE to a Network Service Center (NSC) at a core network side, the first LSC belonging to the NSC;

if the first LSC has received from the NSC a first configuration message which is returned by the NSC after the serving LSC of the first UE fails to be found and which is used to indicate the configuration of the first LSC as the serving LSC of the first UE, the first configuration message carrying a first APG re-allocated by the NSC and uniquely corresponding to the first UE, recording information about the configuration of the first LSC as the serving LSC of the first UE locally in accordance with the first configuration message, establishing and maintaining information about the first APG corresponding to the first UE and information about the LSCs corresponding to the first UE, the LSCs corresponding to the first UE comprising the first LSC as the serving LSC, the first APG comprising the first AP, and transmitting the refresh message of the first APG to each member AP in the first APG; and if the first LSC has received from the NSC a second notification message which is returned after the serving LSC of the first UE has been found and which is used to indicate the serving LSC of the first UE, recording, by the first LSC, the information about the serving LSC of the first UE locally in accordance with the second notification message, receiving the refresh message of the first APG from the serving LSC, and forwarding the refresh message of the first APG to each member AP in the first APG belonging to the first LSC.

3. The dynamic AP grouping method according to claim 1, further comprising:

receiving, by the first LSC, a second request message which is transmitted by the first AP when the first AP is to stop serving the first UE and which is used to request deletion of the first AP from the first APG;

determining, by the first LSC, whether or not the first LSC itself is the serving LSC of the first UE in accordance with the information about the serving LSC of the first UE recorded locally;

if the first LSC itself is the serving LSC of the first UE, deleting the first AP from the first APG in accordance with the second request message, and transmitting the refresh message of the first APG to each member AP in the first APG; and if the first LSC itself is not the serving LSC of the first UE, forwarding the second request message to the serving LSC or the NSC, receiving the refresh message of the first APG transmitted from the serving LSC after the deletion of the first AP from the first APG, and forwarding the refresh message to each member AP in the first APG belonging to the first LSC.

4. The dynamic AP grouping method according to claim 3, wherein after the deletion of the first AP from the first APG, the first LSC further determines whether or not a number of the member APs in the first APG is 0;

when the number of the member APs in the first APG is 0, the first LSC deletes the information about the serving LSC of the first UE locally, deletes the information about the first APG corresponding to the first UE and the information about the LSCs corresponding to the first UE, and transmits a cancellation message for cancelling the first APG to the NSC; and when the number of the member APs in the first APG is not 0, the first LSC further determines whether or not the first APG includes the member APs belonging to the first LSC, when the first APG does not include the member APs belonging to the first LSC, the first LSC deletes the information about the serving LSC of the first UE maintained locally, and transmits to the NSC a third request message for requesting change of the serving LSC of the first UE, the third request message carrying the information about the first APG and the information about the LSCs corresponding to the first UE.

5. The dynamic AP grouping method according to claim 1, wherein when the first LSC is the serving LSC of the first UE, the dynamic AP grouping method further comprises:

receiving, by the first LSC, from a Network Service Center (NSC) or a second LSC a fourth request message for requesting addition of a second AP belonging to the second LSC to the first APG; and adding, by the first LSC, the second AP to the first APG, refreshing the LSCs corresponding to the first UE in accordance with the second LSC, and transmitting the refresh message of the first APG to each member AP in the first APG.

6. The dynamic AP grouping method according to claim 5, wherein when the first LSC is the serving LSC of the first UE, the dynamic AP grouping method further comprises:

receiving, by the first LSC, from the NSC or the second LSC a fifth request message for requesting deletion of the second AP belonging to the second LSC from the first APG; and deleting, by the first LSC, the second AP from the first APG, and transmitting the refresh message of the first APG to each member AP in the first APG.

7. The dynamic AP grouping method according to claim 6, wherein after the deletion of the second AP from the first APG, the dynamic AP grouping method further comprises determining, by the first LSC, whether or not the first APG includes the member AP belonging to the second LSC, and when the first APG does not include the member AP belonging to the second LSC, deleting the second LSC from the LSCs corresponding to the first UE.

8. The dynamic AP grouping method according to claim 1, wherein when the first LSC is a non-serving LSC of the first UE, the dynamic AP grouping method further comprises:
if the first LSC has received from a Network Service Center (NSC) a second configuration message for configuring the first LSC as a new serving LSC, the second configuration message carrying the information about the first APG and the information about the LSCs corresponding to the first UE, configuring the first LSC itself as the new serving LSC of the first UE in accordance with the second configuration message, maintaining locally the information about the serving LSC of the first UE, and establishing the information about the first APG corresponding to the first UE and the information about the LSCs corresponding to the first UE; and
if the first LSC has received from the NSC a third configuration message for refreshing the serving LSC of the first UE, the third configuration message carrying information about the new serving LSC, refreshing the information about the serving LSC of the first UE maintained locally in accordance with the third configuration message.

9. The dynamic AP grouping method according to claim 1, wherein the transmitting the refresh message of the first APG to each member AP in the first APG comprises:
determining, by the first LSC, a non-serving LSC from the LSCs corresponding to the first UE other than the serving LSC, and forwarding, through the non-serving LSC, the refresh message to each member AP in the first APG belonging to the non-serving LSC; and
directly transmitting the refresh message to each member AP in the first APG belonging to the serving LSC.

10. A dynamic Access Point (AP) grouping method, comprising:
receiving, by a Network Service Center (NSC) at a core network side, an inquiry message for inquiring a serving Local Service Center (LSC) of a first User Equipment (UE) from a first LSC at an access network side, the first LSC belonging to the NSC;
determining, by the NSC, whether or not information about the serving LSC corresponding to the first UE is maintained locally in accordance with the inquiry message;
when the information about the serving LSC corresponding to the first UE is not maintained locally, allocating a first Access Point Group (APG) for the first UE, configuring the first LSC as the serving LSC of the first UE, transmitting a first configuration message to the first LSC so as to indicate that the first LSC is configured as the serving LSC of the first UE, and establishing a correspondence among the first UE, the first APG and the serving LSC, the first configuration message carrying information about the first APG; and
when the information about the serving LSC corresponding to the first UE is maintained locally, returning the information about the serving LSC corresponding to the first UE to the first LSC;
wherein the dynamic AP grouping method further comprises:
if the first LSC receives the first configuration message, transmitting, by the first LSC, refresh message of the first APG to each member AP in the first APG, wherein the refresh message carries information about the member APs in the first APG;

wherein transmitting the refresh message of the first APG to each member AP in the first APG comprises:
determining, by the first LSC, a non-serving LSC from LSCs corresponding to the first UE other than the serving LSC, and forwarding, through the non-serving LSC, the refresh message to each member AP in the first APG belonging to the non-serving LSC, wherein the LSCs corresponding to the first UE comprises LSCs to which respective member APs belong; and
directly transmitting the refresh message to each member AP in the first APG belonging to the serving LSC.

11. The dynamic AP grouping method according to claim 10, wherein the inquiry message further carries information about a first AP of the first UE, and the first AP belongs to the first LSC;
wherein subsequent to the returning the information about the serving LSC corresponding to the first UE to the first LSC, the dynamic AP grouping method further comprises transmitting to the serving LSC a second request message for adding the first AP to the first APG corresponding to the first UE and adding the first LSC to the LSCs corresponding to the first UE.

12. The dynamic AP grouping method according to claim 10, further comprising:
receiving, by the NSC, from the serving LSC of the first UE a third request message for requesting change of the serving LSC of the first UE, the third request message carrying the information about the first APG and the information about the LSCs corresponding to the first UE; and
selecting, by the NSC, a new serving LSC of the first UE from the LSCs corresponding to the first UE in accordance with the third request message, transmitting to the new serving LSC a second configuration message carrying the information about the first APG and the information about the LSCs corresponding to the first UE, and transmitting a refresh message of the serving LSC of the first UE to the LSCs corresponding to the first UE, the refresh message carrying information about the new serving LSC.

13. The dynamic AP grouping method according to claim 10, further comprising:
receiving, by the NSC, from the serving LSC of the first UE a cancellation message for cancelling the first APG; and
recovering, by the NSC, the first APG allocated for the first UE in accordance with the cancellation message, and deleting the correspondence among the first UE, the first APG and the serving LSC maintained locally.

14. A dynamic Access Point (AP) grouping method, comprising:
after a first AP has found a first User Equipment (UE), transmitting, by the first AP, a first notification message to a first Local Service Center (LSC) to which the first AP belongs, wherein the first LSC is at an access network side, and service capability of the first AP meets a requirement for providing network access service for the first UE;
receiving, by the first AP, a first refresh message of a first Access Point Group (APG) from the first LSC, the first refresh message carrying information about member APs in the first APG corresponding to the first UE, the first APG comprising the member APs, wherein service capability of each of the member APs currently meets the requirement for providing network access service for the first UE; and maintaining, by the first AP, the first APG corresponding to the first UE locally in accordance with the first refresh message, and providing a data transmission service to the first UE in a Coordinated Multiple Point (CoMP) transmission manner with the member APs in the first APG;

wherein when the first LSC is a serving LSC of the first UE, the first refresh message is transmitted by the first LSC to the first AP directly, and when the first LSC is not the serving LSC of the first UE, the first refresh message is transmitted by the serving LSC of the first UE to the first AP via the first LSC.

15. The dynamic AP grouping method according to claim 14, wherein subsequent to the maintaining the first APG corresponding to the first UE locally, the dynamic AP grouping method further comprises:

receiving, by the first AP, a second refresh message of the first APG from the first LSC, the second refresh message carrying the refreshed first APG; and updating, by the first AP, the first APG maintained locally in accordance with the second refresh message.

16. The dynamic AP grouping method according to claim 14, wherein when the first AP has determined that it is to stop serving the first UE, the dynamic AP grouping method further comprises transmitting, by the first AP, to the first LSC a request message for requesting deletion of the first AP from the first APG, and deleting the first APG maintained locally.

* * * * *